(12) United States Patent
Hedayat et al.

(10) Patent No.: US 11,997,029 B2
(45) Date of Patent: May 28, 2024

(54) DISCOVERY OF TIME DIVISION DUPLEX (TDD) CONFIGURATION OF INTRA-OPERATOR AND INTER-OPERATOR CELLS

(71) Applicant: Charter Communications Operating, LLC, St. Louis, MO (US)

(72) Inventors: Ahmad Reza Hedayat, Carlsbad, CA (US); Marcus Maranhao, Irvine, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 161 days.

(21) Appl. No.: 17/668,852

(22) Filed: Feb. 10, 2022

(65) Prior Publication Data

US 2023/0254076 A1 Aug. 10, 2023

(51) Int. Cl.
*H04L 5/00* (2006.01)
*H04L 5/18* (2006.01)
*H04W 48/14* (2009.01)

(52) U.S. Cl.
CPC .............. *H04L 5/0032* (2013.01); *H04L 5/18* (2013.01); *H04W 48/14* (2013.01)

(58) Field of Classification Search
None
See application file for complete search history.

(56) References Cited

U.S. PATENT DOCUMENTS

| 10,200,139 | B2 * | 2/2019 | Yi | .................. | H04B 7/0417 |
| 2014/0146696 | A1 * | 5/2014 | Lin | .................. | H04L 5/0094 |
| | | | | | 370/252 |
| 2015/0327128 | A1 * | 11/2015 | Fan | .................. | H04L 5/14 |
| | | | | | 370/280 |

OTHER PUBLICATIONS

3rd Generation Partnership Project; Technical Specification Group Radio Access Network; NR; Physical layer procedures for control (Release 16), 3GPP TS 38.213 V16.7.0, Sep. 2021, 188 Pages.
3rd Generation Partnership Project; Technical Specification Group Radio Access Network; NR; Radio Resource Control (RRC) protocol specification (Release 16), 3GPP TS 38.331 V16.7.0 Dec. 2021, 963 pages.

* cited by examiner

*Primary Examiner* — Hong S Cho
(74) *Attorney, Agent, or Firm* — Straub & Straub; Michael P. Straub; Stephen T. Straub

(57) ABSTRACT

Methods and apparatus for supporting communication, discovery, and use of time division duplex (TDD) configuration information between nearby cells are described. A first base station requests a UE to collect and report back TDD configuration information about another base station, e.g., a neighboring base station, from which the UE receives signals, e.g., broadcast signals above a predetermined signal strength threshold. In some embodiments, the requests are qualified based on one of more of: i) inter or intra operator network, ii) radio access technology (RAT) in use, or iii) frequency band. The first base station utilizes reports, communicating TDD configuration information pertaining to nearby base stations, obtained from one or more UEs, to manage interference, e.g., changing the first base station's current TDD configuration settings, generating a new first base station TDD configuration, and/or deciding whether or not to use a frequency band of shared and/or unlicensed spectrum or licensed spectrum.

24 Claims, 13 Drawing Sheets

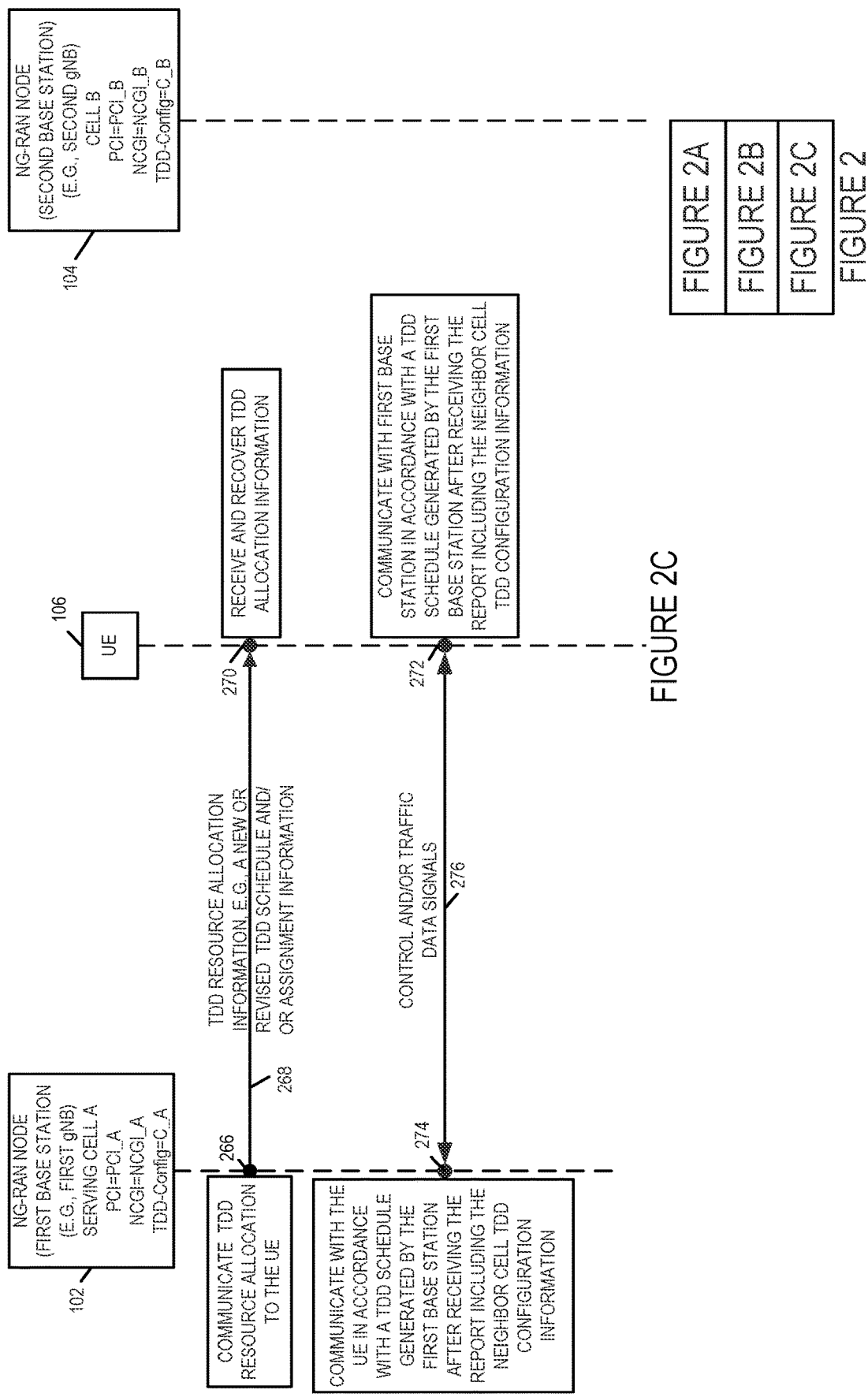

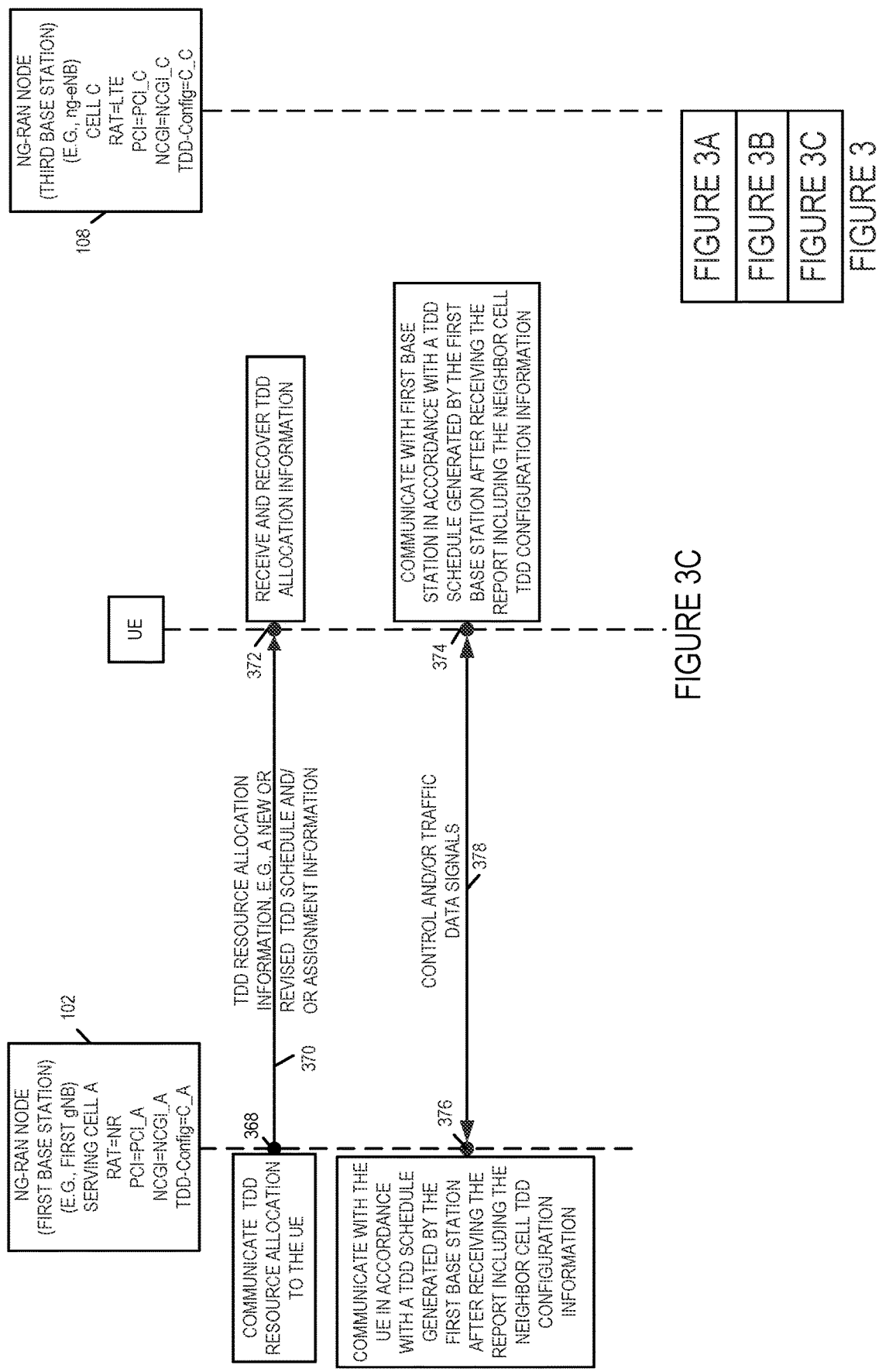

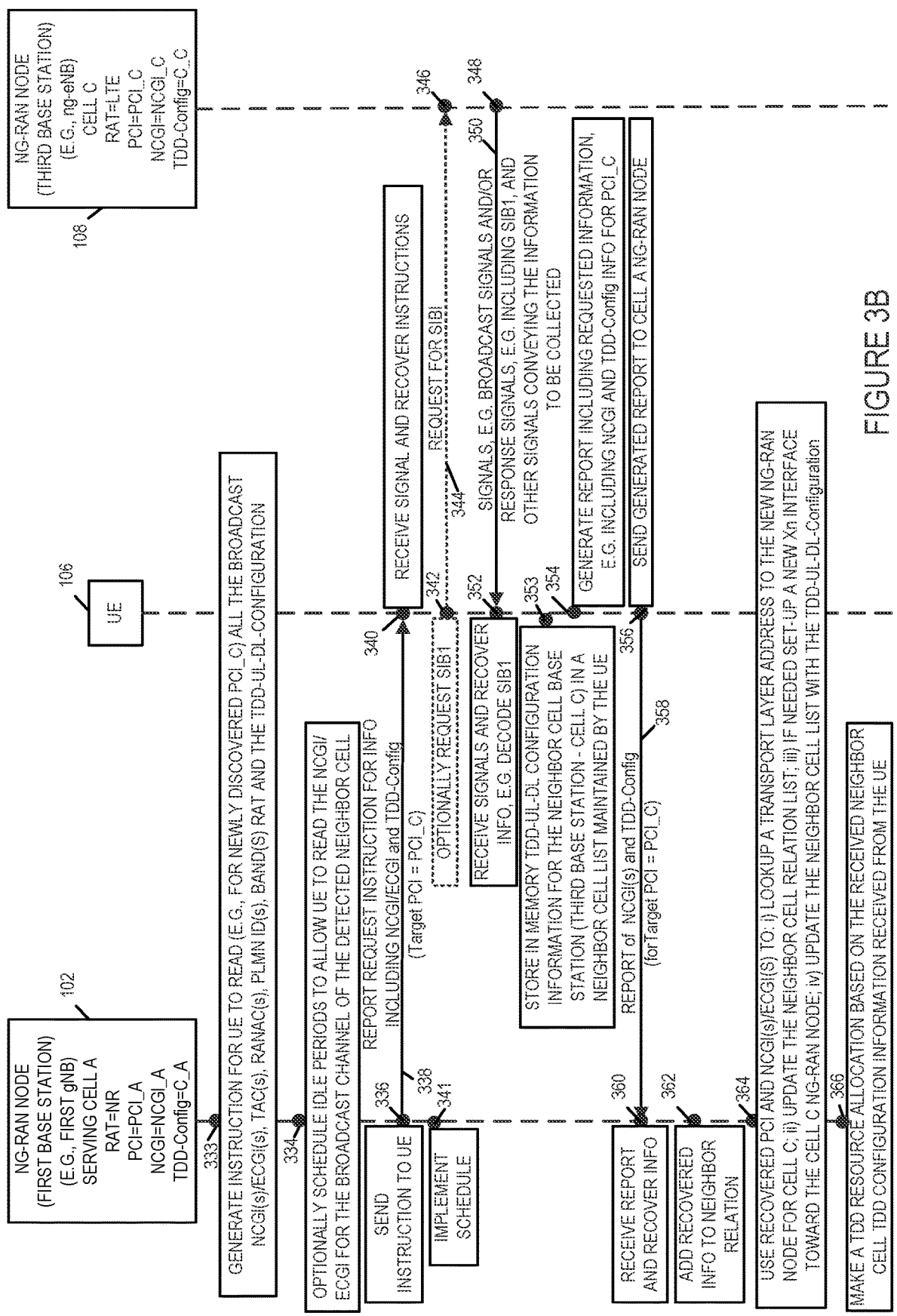

US 11,997,029 B2

DISCOVERY OF TIME DIVISION DUPLEX (TDD) CONFIGURATION OF INTRA-OPERATOR AND INTER-OPERATOR CELLS

FIELD

The present application relates to wireless communications, and more particularly, to methods and apparatus for supporting communication, discovery and use of time division duplex (TDD) configuration information.

BACKGROUND

In time domain division (TDD) multiplexing, a subset of time unit intervals are assigned as downlink (DL) intervals and a second set is declared as uplink intervals (UL). Some unit intervals may be declared as flexible (F) intervals. The time domain structure of DL, UL and F intervals is defined as TDD configuration. In 5G NR, a gNB announces periodically its TDD configuration in SIB1 message. Among the first things that a UE does is to detect SIB1 and find out the TDD configuration of the cell.

TDD configuration among neighbouring cells and the possibility of interference will now be described. For nearby cells that operate in the same frequency or adjacent frequency bands, the choice of TDD configuration is important. The DL transmission of a cell may interfere with the UL reception of another cell if they occur at the same time, pending the pathloss between the two nodes and the frequency separation of their operation.

Due to potential interference, TDD configuration of cells belonging to the same mobile operator are normally judiciously chosen, when possible. However, if nearby cells belong to various mobile operators, such coordination may not be available since the TDD configuration of other cells, e.g., cells belonging to other operators, may not be known.

Thus, it should be appreciated that in cases where neighbor cells are operated by other operators or correspond to a different radio access technology (RAT) there may not be any coordination among nearby cells for alignment of TDD configuration. Even among nearby cells belonging to the same mobile operator full TDD coordination may not be implemented, e.g., because the operator's network may not implement a centralized controller or the operator may desire to keep backhaul overhead signalling between base stations at lower level and avoid the use of backhaul to communicate neighbor cell TDD information.

Furthermore, changes in TDD configuration in neighbor cells may occur over time complicating TDD planning at an individual base station. A TDD configuration for a particular cell may change over time, e.g., in response changing UL/DL needs of the UEs being served by the base station of the cell. Additional base stations in an operator's network may be powered up in response to changing overall needs of the network. Alternatively, an operating base station in an operator's network may be powered down due to a reduction in current demand. Additionally, shared and/or unlicensed spectrum may be utilized by different base stations at different times.

The methods and apparatus can be and sometimes are used for determining and making decisions with regard to licensed and/or unlicensed spectrum.

Based on the above discussion there is a need for new methods and apparatus for discovering TDD information in cells, communicating TDD information between nearby cells which may interfere with one another and/or using TDD information to avoid the occurrence of interference and/or reduce the effect of interference.

SUMMARY

Methods and apparatus for supporting communication, discovery and use of time division duplex (TDD) configuration information between nearby cells are described. In various exemplary embodiments, in accordance with the present invention, a base station learns, e.g., gradually learns, about the TDD configuration of its nearby cells with the help of user equipments (UEs). A first base station requests a UE, with which it has a radio connection, to receive, collect and report back TDD configuration information about another base station, e.g., a nearby base station, sometimes referred to as a neighboring base station, from which the UE receives signals, e.g., broadcast signals detected to be above a predetermined signal strength threshold. In some embodiments, the nearby base station is in the same operator network as the first base station. In some embodiments, the nearby base station is in a different operator network than the first base station and/or is using a different radio access technology than the first base station. In some embodiments, an existing automatic neighbor relation (ANR) function is enhanced to include a TDD information reporting and information usage feature. The first base station utilizes reports, communicating TDD configuration information pertaining to nearby base stations, obtained from one or more UEs, e.g., a large set of UEs being served by the first base station, to manage interference, e.g., changing the first base station's current TDD configuration settings, generating a new first base station TDD configuration, and/or deciding whether or not to use a frequency band of shared and/or unlicensed spectrum. The methods and apparatus can be used for determining TDD configuration and making TDD resource allocations can be used with regard to licensed and/or unlicensed spectrum.

The TDD information discovery and communication methods and apparatus of the present invention can reduce or avoid TDD miss-alignment between neighbor base stations, e.g., by allowing base stations to align at least their downlink time periods and/or to reduce or avoid channel or co-channel interference but allowing a base station to take into consideration the timing structure used by a neighbor base station alone or in combination with frequency use information. Based on received information a base station can and sometimes does adjust its uplink and/or downlink timing and/or frequencies used during uplink and/or downlink communications. Thus, the TDD information received by a base station allows the base station to make TDD adjustments which can reduce interference to the base station and/or UEs with which the base station communications even if the neighboring base stations are using a different radio access technology. Furthermore at least some of the methods can be implemented without the need for TDD information to be communicated over backhaul links making the methods well suited for use where different operators may be operating neighbor base stations and/or backhaul links between base stations may not be available for other reasons, e.g., because the base stations correspond to different networks or technologies.

An exemplary method of operating a first base station, in accordance with some embodiments, comprises: sending to a first user equipment (UE) a request for information on neighboring base station time division duplexing (TDD) information; receiving from the first UE a first report including first neighbor cell identification information and first neighbor cell TDD configuration information corresponding to a first neighboring base station; and making a TDD resource allocation based on the received first neighbor cell TDD configuration information received from the first UE. An exemplary first base station, in accordance with some embodiments, comprises: a wireless transmitter; a wireless receiver; and a processor configured to: operate the first base station to send to a first user equipment (UE) a request for information on neighboring base station time division duplexing (TDD) information; operate the first base station to receive from the first UE a first report including first neighbor cell identification information and first neighbor cell TDD configuration information corresponding to a first neighboring base station; and make a TDD resource allocation based on the received first neighbor cell TDD configuration information received from the first UE.

An exemplary method of operating a first user equipment, in accordance with some embodiments, comprises: receiving, from a first base station, a request for information on neighboring base station time division duplexing (TDD) information; sending from the first UE a first report including first neighbor cell identification information and first neighbor cell TDD configuration information corresponding to a first neighboring base station; and communicating with the first base station in accordance with a TDD schedule generated by the first base station after receiving the first report including first neighbor cell identification information. An exemplary first user equipment (UE), in accordance with some embodiments, comprises: a wireless receiver; a wireless transmitter; memory; and a processor configured to: operate the first UE to receive, from a first base station, a request for information on neighboring base station time division duplexing (TDD) information; operate the first UE to send, from the first UE, a first report including first neighbor cell identification information and first neighbor cell TDD configuration information corresponding to a first neighboring base station; and operate the first UE to communicate with the first base station in accordance with a TDD schedule generated by the first base station after receiving the first report including first neighbor cell identification information.

Numerous variations on the described methods and apparatus are possible and while several embodiments are described in detail it should be appreciated that the full set of detailed steps need not be used in all embodiments with many of the features and determinations being useful even if not used with the other features and steps.

The detailed description which follows describes additional features, details and embodiments which can be used alone or in combination.

BRIEF DESCRIPTION OF THE FIGURES

FIG. 2C is third part of a signaling diagram illustrating an exemplary method of discovery of TDD configuration information, e.g., for intra-system ANR, in accordance with an exemplary embodiment.

FIG. 2 comprises the combination of FIG. 2A, FIG. 2B and FIG. 2C.

FIG. 3B is second part of a signaling diagram illustrating an exemplary method of discovery of TDD configuration information e.g., for inter-system ANR, in accordance with an exemplary embodiment.

FIG. 3C is third part of a signaling diagram illustrating an exemplary method of discovery of TDD configuration information e.g., for inter-system ANR, in accordance with an exemplary embodiment.

FIG. 3 comprises the combination of FIG. 3A, FIG. 3B and FIG. 3C.

DETAILED DESCRIPTION

Figure 1:
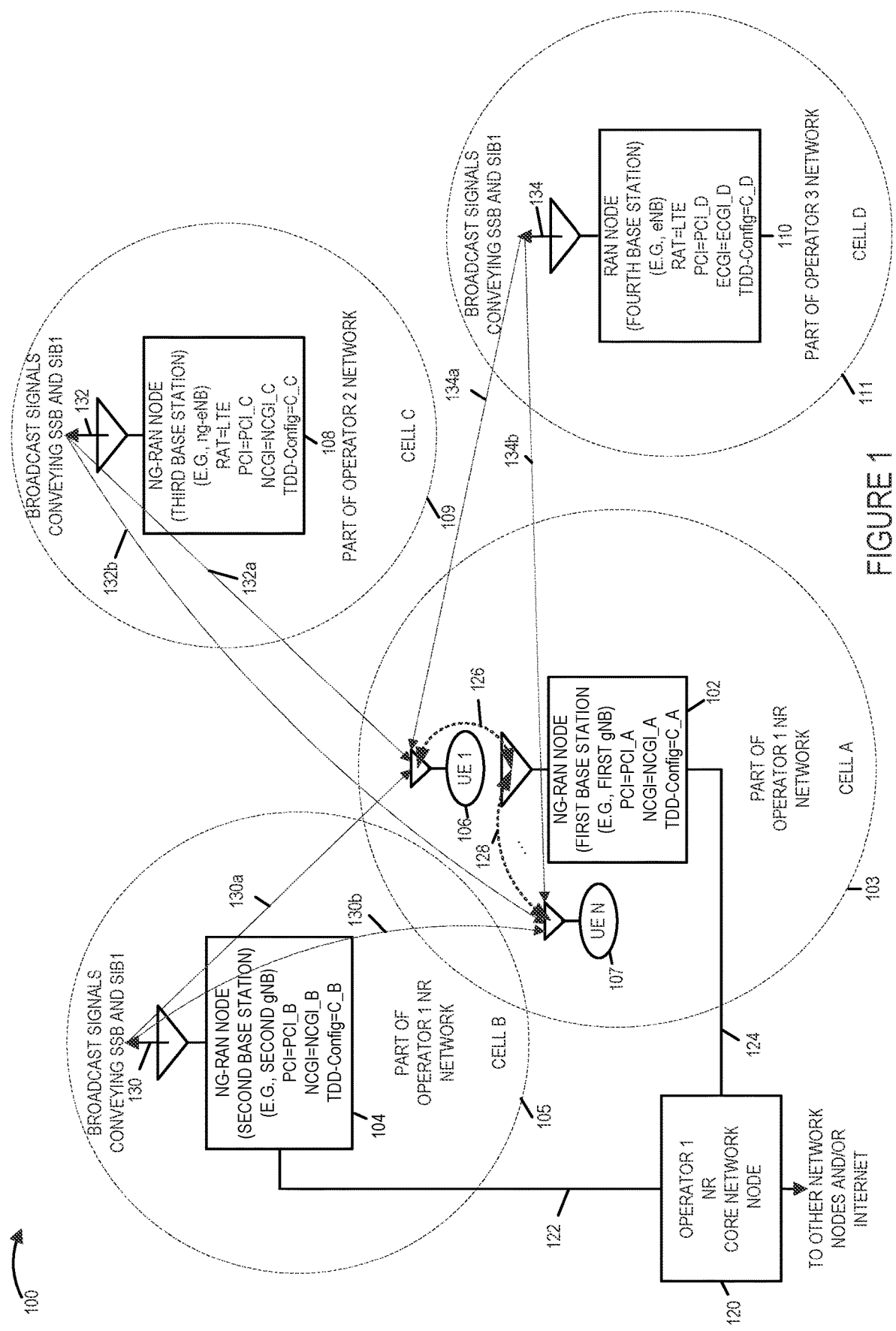
FIG. 1 is a drawing of an exemplary communications system in accordance with an exemplary embodiment.

FIG. 1 is a drawing of an exemplary communications system 100 in accordance with an exemplary embodiment. Exemplary communications system 100 includes a plurality of Next Generation—Radio Access Network (NG-RAN) nodes including NG-RAN node 102, e.g., a first base station, e.g., a first gNB, and NG-RAN node 104, e.g., a second base station, e.g., a second gNB). NG-RAN node 102 has a corresponding cellular coverage area, Cell A 103, and NG-RAN node 104 has a corresponding cellular coverage area, Cell B 105 NG-RAN node 102 and NG-RAN node 104 are part of an operator 1 NR network. The operator 1 NR network further includes a plurality of network nodes including core network node 120. Core network node 120 is coupled to NG RAN node 102 and NG RAN node 104, via communications links 122, 124, respectively. The core network node 120 is coupled to other network nodes and/or the Internet via connection 121. NG-RAN node 102 has a Physical Cell Identity (PCI)=PCI_A, has a NR Cell Global Identity (NCGI)=NCGI_A, and is using a Time Division Duplex-Configuration (TDD-Config)=C_A. NG-RAN node 104 has a PCI=PCI_B, has a NCGI=NCGI_B, and is using a TDD-Config=C_B.

The wireless communications system 100 further includes a plurality of user equipments (UEs) including UE 1 106 and UE N 107. At least some of the UEs are mobile devices which may move throughout the system and be connected to different NG-RAN nodes at different times. UE 1 106 and UE N 107 as shown in FIG. 1, as currently connected to NG-RAN node 102, e.g., the first base station (first gNB), and have established radio resource connections (RRCs) with NG-RAN node 102, as indicated by bi-directional dashed line arrows (126, 128), respectively.

The communications system 100 further includes one or more additional NG-RAN nodes including NG-RAN node 108, which is not part of the operator 1 NR network. NG-RAN node 108, e.g., a third base station, e.g., a ng-eNB, has a corresponding cellular coverage area, cell C 109, uses Radio Access Technology (RAT)=Long Term Evolution (LTE), has a PCI=PCI_C, has a NCGI=NCGI_C and is currently using TDD-Config=C_C. The communications system 100 further includes one or more additional RAN nodes including RAN node 110, which is not part of the operator 1 NR network. RAN node 110, e.g., a fourth base station, e.g., an eNB, has a corresponding cellular coverage area, cell D 111, uses Radio Access Technology (RAT)= Long Term Evolution (LTE), has a PCI=PCI_D, has a Extended Cell Global Identity (ECGI)=ECGI_C and is currently using TDD-Config=C_D.

Each of the base station (102, 104, 108, 110) are transmitting broadcast signals conveying Synchronization Signal Block (SSB), which is Synchronization/PCBH block, and System Information Block 1 (SIB1), repetitively on an ongoing basis. UE 1 106 and UE N 107, which each currently have a RRC connection (126, 128) with the first base station 102, are monitoring for and receiving broadcast signals from neighboring base stations, e.g., as part of ongoing automatic neighbor relations (ANR) data collection operations and/or in response to a request from the first base station 102. Broadcast signals 130 from base station 2 104 are received by UE1 106 as signals 130a. Broadcast signals 130 from base station 2 104 are received by UE N 107 as signals 130b. Broadcast signals 132 from base station 3 108 are received by UE1 106 as signals 132a. Broadcast signals 132 from base station 3 108 are received by UE N 107 as signals 132b. Broadcast signals 134 from base station 4 110 are received by UE1 106 as signals 134a. Broadcast signals 134 from base station 4 110 are received by UE N 107 as signals 134b.

Data communicated via the SSB includes a PCI, while data communicated via the SIB1 includes: i) NCGI or ECGI and ii) TDD-configuration information. A UE, e.g., UE 106, measures the strength received SSB signals from a base station and recovers a communicated PCI, and reports the results back to first base station 102. A UE, e.g., UE 106, decodes a received SIB1 and recovers a NCGI or ECGI and TDD-configuration information, and reports the recovered information back to the first base station 102. The ANR included in the first base station 102 uses the received information to update stored ANR information and/or make decisions about whether a frequency band can be used by the first base station and/or the TDD configuration that the first base station 102 should use in a particular frequency band.

Figure 2A:
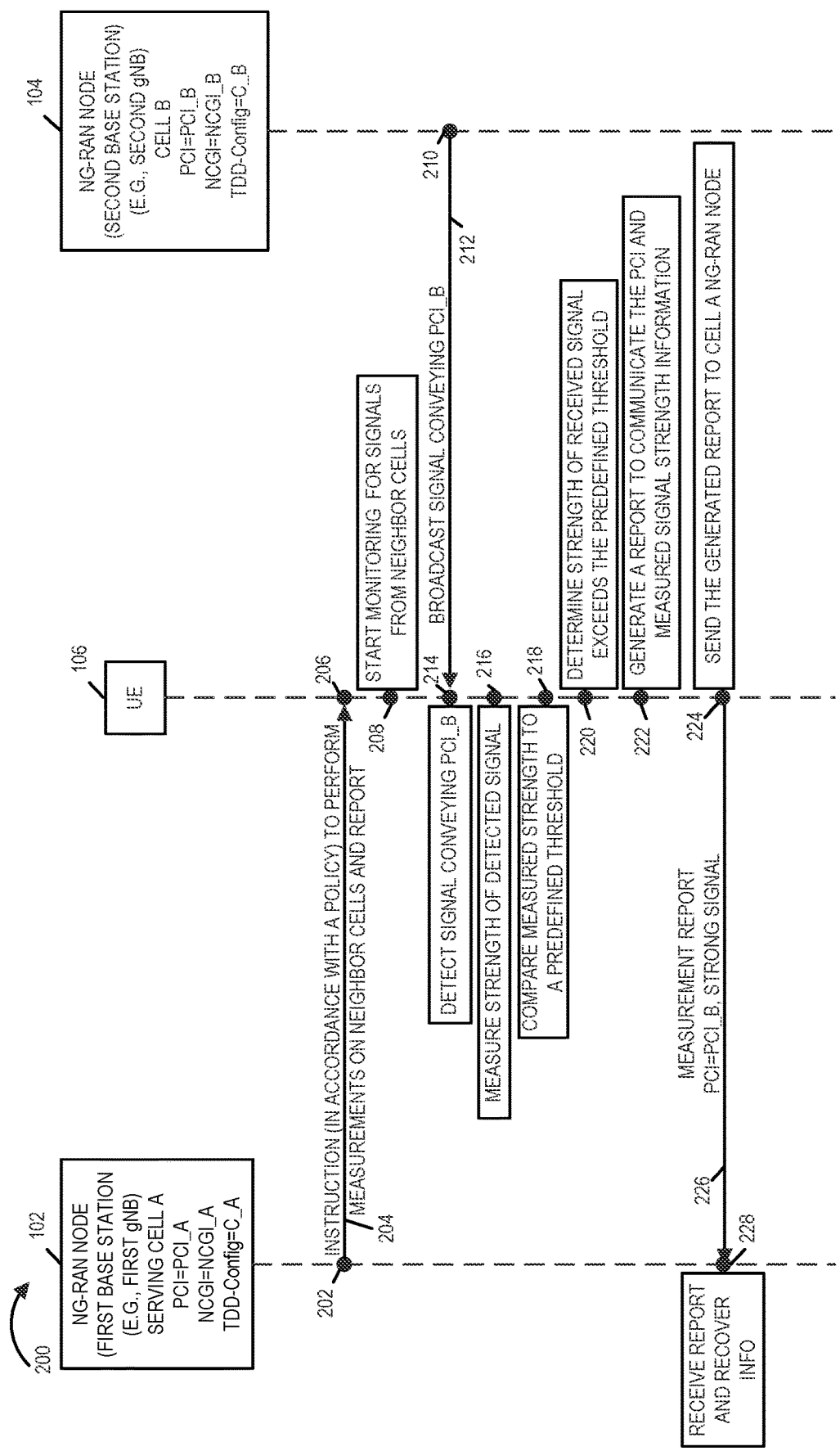
FIG. 2A is first part of a signaling diagram illustrating an exemplary method of discovery of time division duplex (TDD) configuration information, e.g., for intra-system Automatic Neighbor Relation (ANR), in accordance with an exemplary embodiment.
Figure 2B:
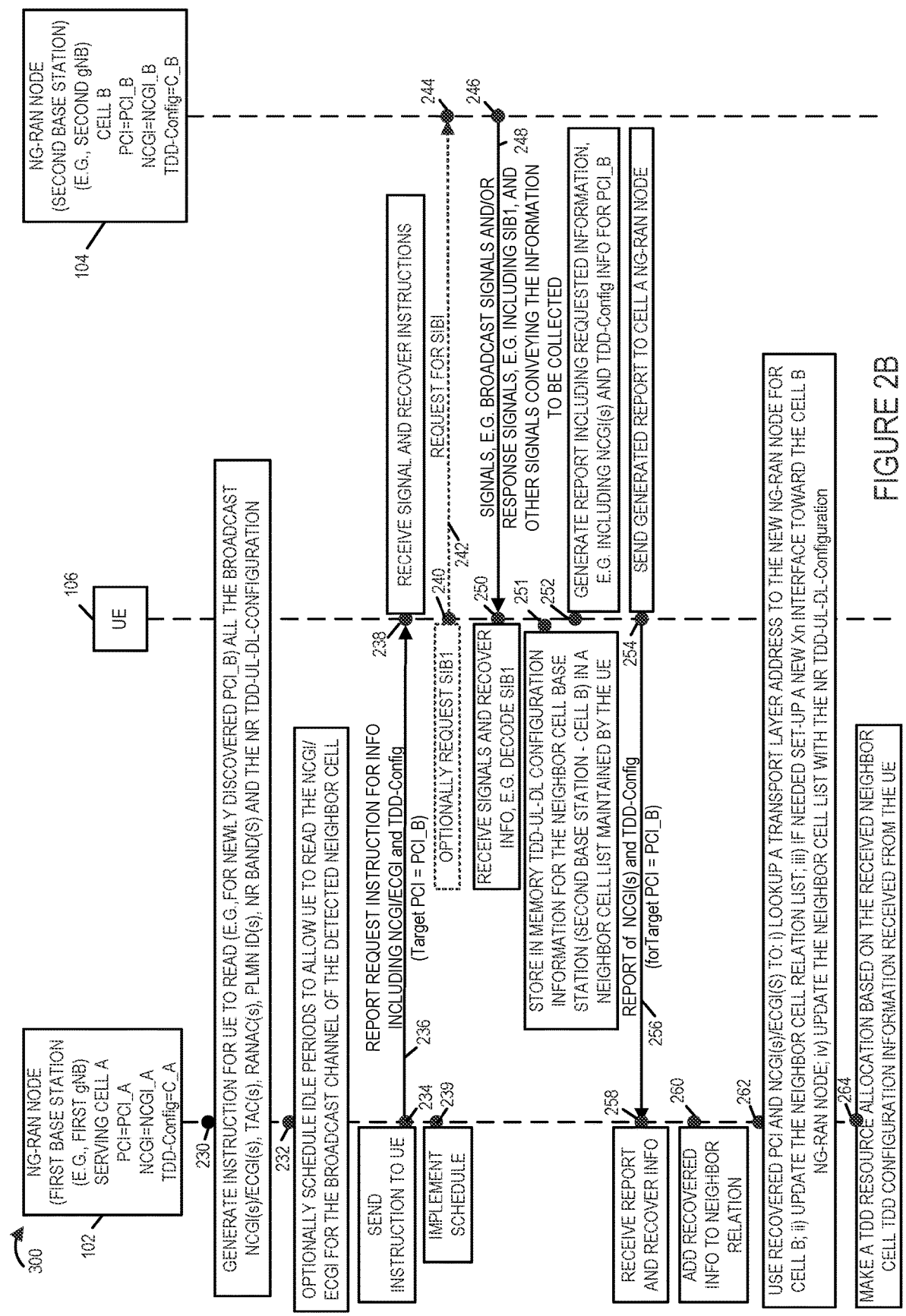
FIG. 2B is second part of a signaling diagram illustrating an exemplary method of discovery of TDD configuration information, e.g., for intra-system ANR, in accordance with an exemplary embodiment.

FIG. 2, comprising the combination of FIG. 2A, FIG. 2B and FIG. 2C, is a signaling diagram 200 illustrating exemplary steps and signals of an exemplary method of operating a communications system in accordance with an exemplary embodiment. The exemplary communications system implementing the method signaling diagram 200 includes two Next Generation-Radio Access Network (NG-RAN) nodes (first base station 102, e.g., a first gNB, second base station 104, e.g., a second gNB), and a user equipment (UE) 106. First base station 102 is serving cell A, has a Physical Cell Identifier (PCI)=PCI_A, has a NR Cell Global Identity (NCGI)=NCGI_A, and has a Time Division Duplex-Configuration (TDD-Config)=C_A.

Second base station 104 is serving cell B, has a PCI=PCI_B, has a NCGI=NCGI_B, and has a TDD-Config=C_B.

Consider that UE 106 has established a radio connection with first base station 102. In step 202 first base station 102 generates and sends signal 204 to UE 106, said signal 204 communicating instructions, in accordance with an implemented policy, to perform measurements on neighbor cells and report back. In step 206 UE 106 receives signal 204 and recovers the communicated instructions. In step 208 UE 106 starts monitoring for signals from neighbor cells, e.g., signals such as broadcast signals communicating a Synchronization Signal/PCCH Block (SSB) including a Primary Synchronization Signal (PSS) and a secondary Synchronization Signal (SSS) conveying a PCI value.

In step 210 the second base station 104 generates and transmits a broadcast signal 212 conveying PCI_B. In step 214, the UE 106 detects signal 212 conveying PCI_B. In step 216 the UE 106 measures the strength of the detected signal. In step 218 the UE 106 compares the measured strength of the detected signal to a predetermined threshold. In step 220 the UE 106 determines that the strength of the received signal exceeds the predetermined threshold. In step 222, the UE 106, in response to the determination that the strength of the received signal exceeds the predetermined threshold, generates a report to communicate the PCI and measured signal strength information. In step 222, as part of generating a report, the UE 106 determines that the PCI value is PCI_B, e.g., by decoding information communicated in the received PSS and received SSS. In step 224 the UE 106 generates and sends signal 226 to first base station 102, said signal 226 communicating the generated measurement report. The measurement report conveys the PCI=PCI_B and information indicating that the received signal is a strong signal, e.g., above the predetermined threshold level. In some embodiments, the generated report includes a value indicating the received signal strength. Note that the report communicated in signal 226 in some embodiments does not include a NCGI/ECGI. In other embodiments the NCGI/ECGI is included in the report 226. In step 228, the first base station 102 receives the measurement report and recovers the communicated information. Operation proceeds from step 228 to step 230.

In step 230 the first base station 102 generates instructions for UE 106 to read (for the newly discovered PCI_B) all the broadcast NCGI(s)/ECGI(s), TAC(s), RANAC(s), PLMN ID(s) NR band(s), and the NR TDD-UL-DL-Configuration. In some embodiments, option step 232 is performed, in which the first base station 102 schedules idle periods to allow the UE 106 to read the NCGI/ECGI and other information for the broadcast channel of the detected neighbor cell. In step 234, the first base station 102 generates and sends signal 256 to UE 106, said signal 256 conveying the generated instruction of step 230. Thus signal 236 conveys a report request instruction for information including NCGI/ECGI and TDD-Config. for target PCI=PCI_B. Operation proceeds from step 234 to step 238.

In step 238 UE 106 receives signal 236, recovers the communicated instructions, and starts implementing the received instructions, e.g., monitoring for broadcast signal from the second base station 104 conveying the requested information.

In option step 239, when implemented, the first base station 102 implements a transmission schedule including operating the first base station 102 to refrain from transmission during the scheduled idle periods (of step 234), e.g., to allow UEs, e.g., UE 106, to make measurements of neighboring base station signals, e.g. including broadcast signals from base station 2 104, without experiencing interference from transmission from the first base station 102.

In some embodiments, UE 106 performs optional step 240, in which UE 106 generates and sends a request 242 to the second base station 104 for System Information Block 1 (SIB1). In some embodiments, UE 106 performs optional step 240 if the UE 106 has not detected the SIB1 after monitoring for a predetermined length of time. In step 244, the second base station 104 receives the request for SIB1.

In step 246, the second base station 104 transmits signals 248, e.g., broadcast signals and/or response signals, e.g., including SIB1 and other signals conveying the information to be collected. In step 250 the UE 106 receives signals 248 and recovers information, e.g., decodes SIB1 to recover information of interest including NCGI(s) and TDD-Config. Additional information recovered in step 250 includes, e.g., one or more of all of TAC(s), RANAC(s), PLMN ID(s), and NR band(s). In step 251 the UE 106 stores in its memory the recovered neighbor cell information including the TDD-UL-DL configuration information and a NCGI(s) (for second base station 104—cell B—PCI_B). In step 252 the UE 106 generates a report included the requested information, e.g., a report including NCGI(s) and TDD-Config. information for PCI_B. In step 254 UE 106 generates and sends signals 256, conveying the generated report including NCGI(s) (e.g., NCGI_B) and TDD-Config (e.g., C_B), information for target PCI=PCI_B, to first base station 102.

In step 258 the first base station 102 receives the report of signal 256 and recovers the communicated information including NCGI=NCGI_B and TDD-Config.=C_B. In step 260 the first base station 102 adds the recovered information to neighbor relation information. Operation proceeds from step 260 to step 262.

In step 262 the first base station 102 uses the recovered PCI and NCGI(s)/ECGI(s) to: i) lookup a transport layer address to the new NG-RAN node for cell B; ii) update the neighbor cell relation list; iii) if needed, set-up a new Xn interface toward the cell B NG-RAN node 104; iv) update the neighbor cell list with the NR TDD-UL-DL-Configuration.

In step 264 the first base station 102 makes a TDD resource allocation based on the received neighbor cell TDD configuration information (e.g., cell B TDD configuration information) received from UE 106 (e.g., in step 258). For example, the first base station 102 schedules TDD so that downlink transmission coincide with that of one or more neighbor cells including a first neighboring cell, e.g. cell B, and/or schedule uplink transmissions so the they occur when downlink transmission of the neighboring cell, e.g. cell B, and/or flexible slots in the neighboring cell, e.g. cell B, occur, e.g., to avoid interference from other base station's downlinks, e.g. avoid interference from base station 2 104 downlink, when UEs are trying to transmit uplink signals to the first base station 102. In some embodiments, making, at the first base station 102, a TDD resource allocation based on the received first neighbor cell TDD configuration information, e.g. cell B TDD configuration, received from the UE 106, includes assigning a first set of frequency resources to be used for downlink communications when the neighboring base station, e.g. base station 2 104, is using frequency resources (e.g., frequency resources in the first set of frequency resources or frequency resources adjacent said first set of frequency resources) for downlink communication.

In step 266 the first base station 102 is operated to send the TDD resource allocation information, e.g., a new or revised TDD schedule and/or assignment information, in signals 268, to UE 106. In step 270 the UE 106 receives and recovers the TDD allocation information. In step 272 the UE 106 is operated to communicate with the first base station 102 in accordance with a TDD schedule generated by the first base station after receiving the report including the neighbor cell TDD configuration information, e.g., base station 104 cell B TDD configuration information=C_B. In step 274 the base station 102 is operated to communicate with the UE 106 in accordance with the TDD schedule generated by the first base station after receiving the report including the neighbor cell TDD configuration information, e.g., base station 104 cell B TDD configuration information=C_B. Bi-directional arrow 276 represents control and/or traffic signals being communicated between the UE 106 and the base station 102 in accordance with the TDD schedule generated by the first base station after receiving the report including the neighbor cell TDD configuration information, e.g., base station 104 cell B TDD configuration information.

In various embodiments, the first base station 102, which corresponds to cell A 103, and the second base station 104, which corresponds to cell B 105 and which is a neighboring base station to the first base station 102, are part of the same NR operator network.

Figure 3A:
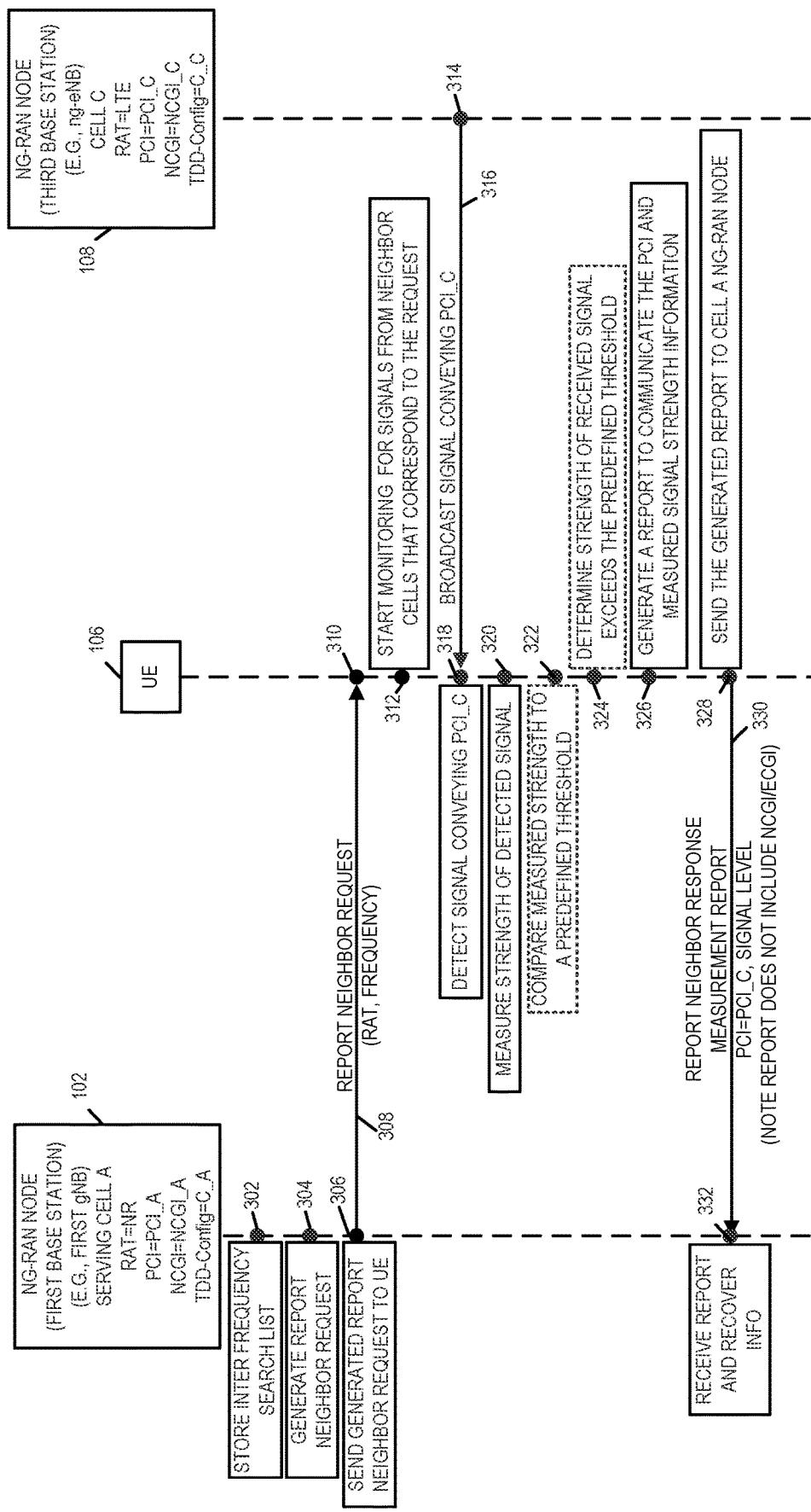
FIG. 3A is first part of a signaling diagram illustrating an exemplary method of discovery of time division duplex (TDD) configuration information e.g., for inter-system ANR, in accordance with an exemplary embodiment.

FIG. 3, comprising the combination of FIG. 3A, FIG. 3B and FIG. 3C, is a signaling diagram 300 illustrating exemplary steps and signals of an exemplary method of operating a communications system in accordance with an exemplary embodiment. The exemplary communications system implementing the method signaling diagram 300 includes two Next Generation-Radio Access Network (NG-RAN) nodes (first base station 102, e.g., a first gNB, third base station 106, e.g., a second ng-eNB), and a user equipment (UE) 106. First base station 102 is serving cell A, uses Radio Access Technology (RAT)=New Radio (NR), has a Physical Cell Identifier (PCI)=PCI_A, has a NR Cell Global Identity (NCGI)=NCGI_A, and has a Time Division Duplex-Configuration (TDD-Config)=C_A. Third base station 108 is serving cell C, uses RAT=Long Term Evolution (LTE), has a PCI=PCI_C, has a NCGI=NCGI_C, and has a TDD-Config=C_C.

In step 302, the first base station 102 stores a inter frequency search list. Consider that UE 106 has established a radio connection with first base station 102. In step 304 first base station 102 generates a report neighbor request, said report neighbor request specifying a RAT and a frequency. In step 306, the first base station 102 generated and sends signals 308 conveying the generated report neighbor request to UE 106. In step 310 the UE 106 receives signal 308 and recovers the report neighbor request. In step 312 the UE starts to monitor for signals from neighbor cells that correspond to the request.

In step 314 third base station 108 transmits broadcast signals 316, using a request RAT and within a request frequency band, said broadcast signals 316 conveying PCI_C, e.g., communicated in a Synchronization Signal/PBCH Block (SSB) including a Primary Synchronization Signal (PSS) and a secondary Synchronization Signal (SSS).

In step 318, the UE 106 detects signal 318 conveying PCI_C. In step 320 the UE 106 measures the strength of the detected signal. In some embodiments, optional steps 322 and 324 are performed. In other embodiments, optional steps 322 and 324 are omitted.

In step 322 the UE 106 compares the measured strength of the detected signal to a predetermined threshold. In step 324 the UE determine if the strength of the received signal exceeds the predetermined threshold, and proceeds to step 326 if the determination is that the received signal strength has exceeded the predetermined threshold.

In step 326, the UE 106 generates a report neighbor response measurement report to communicate the PCI and measured signal strength information. In step 326, as part of generating a report, the UE 106 determines that the PCI value is PCI_C, e.g., by decoding information communicated in the received PSS and received SSS. In step 328 the UE 106 generates and sends signal 330 to first base station 102, said signal 330 communicating the generated report neighbor response measurement report. The measurement report conveys the PCI=PCI_C and information indicating the received signal strength level. Note that the report communicated in signal 330 does not include a NCGI/ECGI. In step 332, the first base station 102 receives the report neighbor response measurement report and recovers the communicated information. Operation proceeds from step 332 to step 333.

In step 333 the first base station 102 generates instructions for UE 106 to read (for the newly discovered PCI_C) all the broadcast NCGI(s)/ECGI(s), TAC(s), RANAC(s), PLMN ID(s) band(s), and the TDD-UL-DL-Configuration. In some embodiments, optional step 334 is performed, in which the first base station 102 schedules idle periods to allow the UE 106 to read the NCGI/ECGI and other information for the broadcast channel of the detected neighbor cell. In step 336, the first base station 102 generates and sends signal 338 to UE 106, said signal 338 conveying the generated instruction of step 333. Thus signal 338 conveys a report request instruction for information including NCGI/ECGI and TDD-Config. for target PCI=PCI_C. Operation proceeds from step 336 to step 340.

In step 340 UE 106 receives signal 338, recovers the communicated instructions, and starts implementing the received instructions, e.g., monitoring for broadcast signal from the third base station conveying the requested information.

In option step 341, when implemented, the first base station 102 implements a transmission schedule including operating the first base station 102 to refrain from transmission during the scheduled idle periods (of step 334), e.g., to allow UEs, e.g., UE 106, to make measurements of neighboring base station signals, e.g., including broadcast signals from base station 3 108, without experiencing interference from transmission from the first base station 102.

In some embodiments, UE 106 performs optional step 342, in which UE 106 generates and sends a request 344 to the third base station 108 for Synchronization Information Block 1 (SIB1). In some embodiments, UE performs optional step 342 if the UE 106 has not detected the SIB1 after monitoring for a predetermined length of time. In step 346, the third base station 106 receives the request for SIB1.

In step 348, the third base station 108 transmits signals 350, e.g., broadcast signals and/or response signals, e.g., including SIB1 and other signals conveying the information to be collected. In step 352 the UE 106 receives signals 350 and recovers information, e.g., decodes SIB1 to recover information of interest including NCGI(s) and TDD-Config. Additional information recovered in step 352 includes, e.g., one or more of all of TAC(s), RANAC(s), PLMN ID(s), band(s), RAT(s). In step 353 the UE 106 stores in its memory the recovered neighbor cell information including the TDD-UL-DL configuration information and a NCGI(s) (for third base station 108—cell C—PCI_C. In step 354 the UE 106 generates a report including the requested information, e.g., a report including NCGI(s) and TDD-Config. information for PCI_C. In step 356 UE 106 generates and sends signals 358, conveying the generated report including NCGI(s) (e.g., NCGI_C) and TDD-Config (e.g., C_C), information for target PCI=PCI_C, to first base station 102.

In step 360 the first base station 102 receives the report of signal 358 and recover the communicated information including NCGI=NCGI_C and TDD-Config.=C_C. In step 362 the first base station 102 adds the recovered information to neighbor relation information. Operation proceeds from step 362 to step 264.

In step 364 the first base station 102 uses the recovered PCI and NCGI(s)/ECGI(s) to: i) lookup a transport layer address to the new NG-RAN node for cell C; ii) update the neighbor cell relation list; iii) if needed, set-up a new Xn interface toward the cell B NG-RAN node 108; iv) update the neighbor cell list with the TDD-UL-DL-Configuration.

In step 366 the first base station 102 makes a TDD resource allocation based on the received neighbor cell TDD configuration information (e.g., cell C TDD configuration information) received from UE 106 (e.g., in step 360). For example, the first base station 102 schedules TDD so that downlink transmission coincide with that of one or more neighbor cells including a first neighboring cell, e.g. cell C, and/or schedule uplink transmissions so the they occur when downlink transmission of the neighboring cell, e.g. cell C, and/or flexible slots in the neighboring cell, e.g. cell C, occur, e.g., to avoid interference from other base station's downlinks, e.g. avoid interference from base station 3 108 downlink, when UEs are trying to transmit uplink signals to the first base station 102. In some embodiments, making, at the first base station 102, a TDD resource allocation based on the received first neighbor cell TDD configuration information, e.g. cell C TDD configuration, received from the UE 106, includes assigning a first set of frequency resources to be used for downlink communications when the neighboring base station, e.g. base station 3 108, is using frequency resources (e.g., frequency resources in the first set of frequency resources or frequency resources adjacent said first set of frequency resources) for downlink communication.

In step 368 the first base station 102 is operated to send the TDD resource allocation information, e.g., a new or revised TDD schedule and/or assignment information, in signals 370, to UE 106. In step 372 the UE 106 receives and recovers the TDD allocation information. In step 374 the UE 106 is operated to communicate with the first base station 102 in accordance with a TDD schedule generated by the first base station after receiving the report including the neighbor cell TDD configuration information, e.g., base station 108 cell C TDD configuration information=C_C. In step 376 the base station 102 is operated to communicate with the UE 106 in accordance with the TDD schedule generated by the first base station after receiving the report including the neighbor cell TDD configuration information, e.g., base station 108 cell C TDD configuration information=C_C. Bi-directional arrow 378 represents control and/or traffic signals being communicated between the UE 106 and the base station 102 in accordance with the TDD schedule generated by the first base station after receiving the report including the neighbor cell TDD configuration information, e.g., base station 108 cell C TDD configuration information.

In various embodiments, the first base station 102, which corresponds to cell A 103, and the third base station 108, which corresponds to cell C 109 and which is a neighboring base station to the first base station 102, belong to different operator networks.

Figure 4:
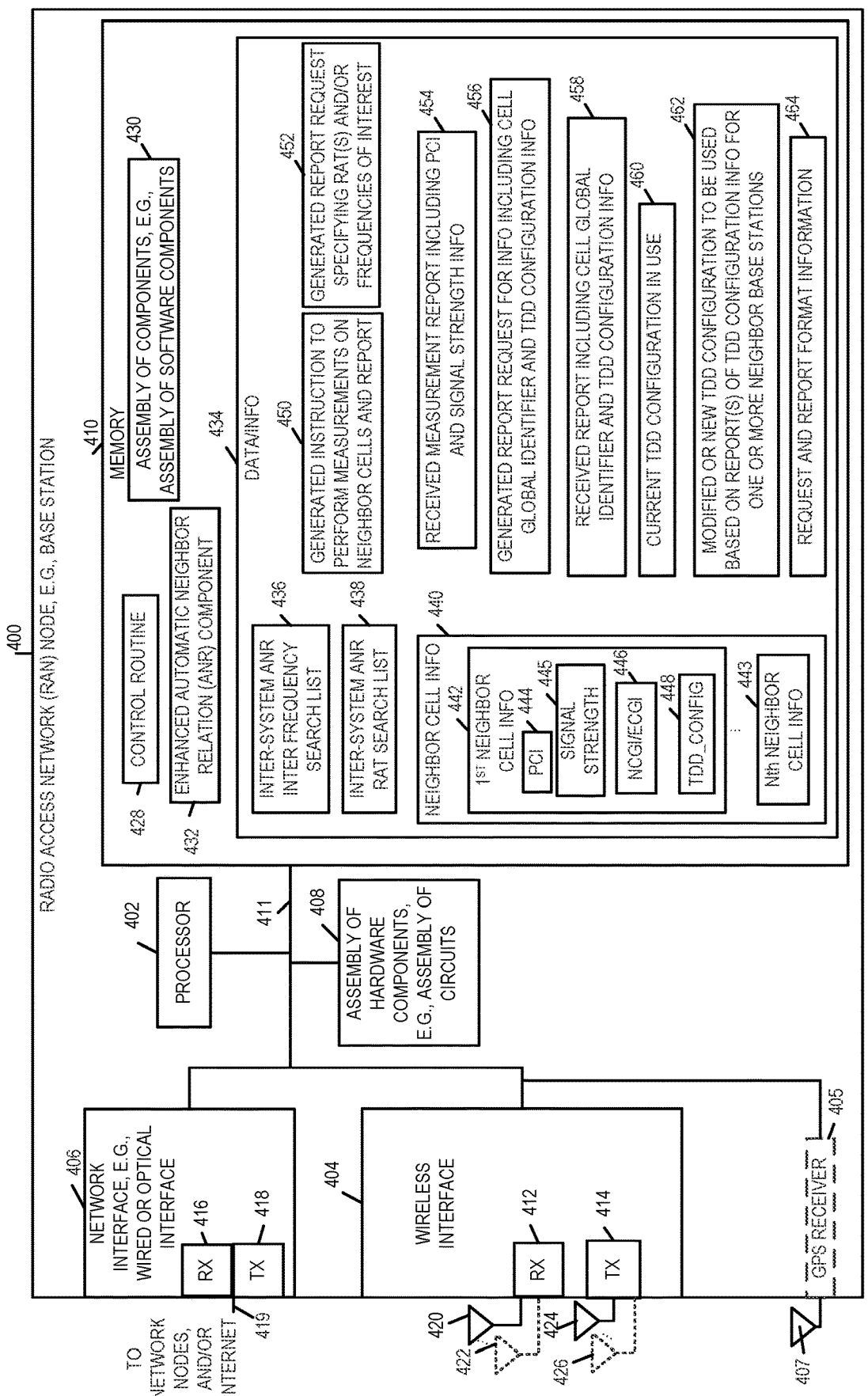
FIG. 4 is a drawing of an exemplary radio access network (RAN) node, e.g., a base station, in accordance with an exemplary embodiment.

FIG. 4 is a drawing of an exemplary radio access network (RAN) node 400, e.g., a base station, in accordance with an exemplary embodiment. Exemplary RAN node 400 is, e.g., exemplary NG-RAN node 102, e.g., a gNB base station, of FIGS. 1-3 and/or a RAN node, e.g., a gNB base station, implementing the method of flowchart 700 of FIG. 7.

RAN node 400 includes a processor 402, e.g., a CPU, a wireless interface 404, a network interface 406, e.g., a wired or optical interface, an assembly of hardware components 408, e.g., an assembly of circuits, and memory 410 coupled together via a bus 411 over which the various elements may interchange data and information. In some embodiments, TAN node 400 further includes a GPS receiver 405 coupled to bus 411.

Wireless interface 404 includes a wireless receiver 412 and a wireless transmitter 414. Wireless receiver 412 is coupled to a plurality of receive antennas or receive antenna elements (420, . . . 422), via which the RAN node 400 may receive wireless signals from UE devices. Wireless transmitter 414 is coupled to a plurality of transmit antenna or transmit antenna elements (424, . . . , 426), via which the RAN node 400 may transmit wireless signals to UE devices.

GPS receiver 405 is coupled to GPS antenna 407, via which the RAN node 400 may receive GPS signals from GPS satellites, said received GPS signals used by the GPS receiver to determine time and location information, e.g., latitude/longitude/altitude of the RAN node.

Network interface 406 includes a receiver 416 and a transmitter 418. The receiver 416 and transmitter 418 are coupled to connector 419, via which the RAN node 400 is coupled to network nodes, e.g., other RAN nodes, core network nodes, etc., and/or the Internet.

Memory 410 includes a control routine 428, an assembly of components 430, e.g., an assembly of software components, an automatic neighbor relation (ANR) component 432, and data/information 434. The control routine 428 includes instructions, which when executed by processor 402 control RAN node 400 to implement basic operational functions, e.g., read memory, load instructions into the CPU, control an interface, etc. Assembly of components 430 includes, e.g., software routines, subroutines, modules, etc., which when implemented by a processor, e.g., processor 402, implement steps of an exemplary method, e.g., steps of the method of signaling diagram 200 of FIG. 2 and/or steps of the method of signaling diagram 300 of FIG. 3. Enhanced automatic neighbor relation (ANR) component 432, is e.g., an ANR module includes features of the present invention, e.g., supporting the acquisition, storage and use of TDD configuration information corresponding to neighbor cells as part of ANR operations. In some embodiments, ANR component 432 is included as part of assembly of components 430. In some embodiments, some of the components in assembly of components 430 are includes as part of ANR component 432.

Data/information 434 includes an inter-system ANR inter frequency search list 436, a inter-system ANR RAT search list 438, a neighbor cell list 440, a generated instruction to perform measurements on neighbor cells and report 450, e.g. to be sent to UEs, a generated report request specifying RAT(s) and/or frequencies of interest 452, e.g., to be sent to UEs, a received measurement report including PCI(s) and signal strength information, a generated report request 456 for information corresponding to an identified neighbor cell, said request requesting information about the neighbor cell including a cell global identifier (NGCI/ECGI) and TDD-UL-DL configuration information, a received report 458 including a cell global identifier and TDD configuration information, information 460 specifying and/or identifying a current TDD configuration in use by the base station 400, information 462 specifying and/or identifying a modified or new TDD configuration to be used based on report(s) of TDD configuration for one or more neighbor base stations, and request and report format information 464, e.g. used to generate and/or decode requests and/or reports.

Neighbor cell list 440 includes a plurality of sets of information corresponding to different neighbor cells for which data has been collected (1st neighbor cell information 442, . . . , nth neighbor cell information 443). 1st neighbor cell information 442 includes a PCI 444, a signal strength value 445, a NCGI/ECGI 446, and TDD-Configuration information 448.

Figure 5:
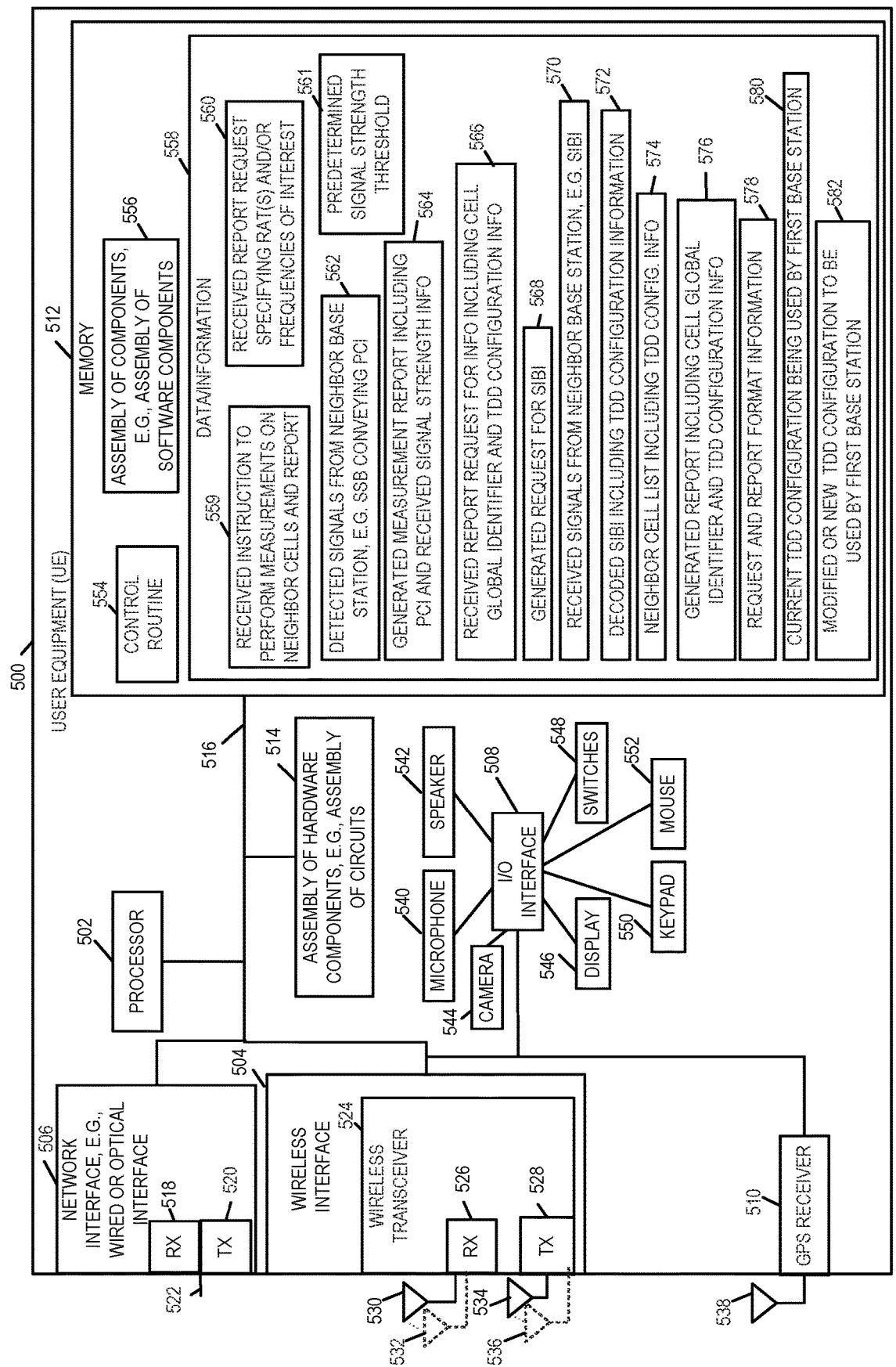
FIG. 5 is a drawing of an exemplary user equipment (UE) in accordance with an exemplary embodiment.

FIG. 5 is a drawing of an exemplary user equipment (UE) 500 in accordance with an exemplary embodiment. Exemplary UE 500 is, e.g., UE 102 of FIGS. 1-3, and/or a UE implementing the method of flowchart 600 of FIG. 6.

Exemplary UE 500 includes a processor 502, e.g., a CPU, a wireless interface 504, a network interface 506, an I/O interface 508, a GPS receiver 510, memory 512, and an assembly of hardware components 514, e.g., an assembly of circuits, coupled together via a bus 516 over which the various elements may interchange data and information. UE 500 further includes a plurality of different I/O devices (microphone 540, speaker 542, camera 544, display 546, e.g., a touch screen display, switches 548, keypad 550, mouse 552) coupled to I/O interface 508, which couples the various I/O devices to the other elements within UE 500.

Wireless interface 504 includes a wireless receiver 526 and a wireless transmitter 528. In some embodiments, the wireless receiver 526 and wireless transmitter 528 are included as part of wireless transceiver 524, e.g., a wireless transceiver chip. Wireless receiver 526 is coupled to one or more receive antennas or antenna elements (530, . . . , 532) via which the UE 500 may receive wireless signals from RAN nodes, e.g., base stations. Wireless transmitter 528 is coupled to one or more transmit antennas or transmit antenna elements (534, . . . , 536) via which the UE 500 may transmit wireless signals to RAN nodes, e.g., base stations. In some embodiments, the same antennas or antenna elements may be, and sometimes are, used by both the wireless receiver 526 and the wireless transmitter 528, e.g., with the UE 500 operating in a time division duplex (TDD) mode of operation.

Network interface 506 includes a receiver 518 and a transmitter 520. The receiver 518 and transmitter 520 are coupled to connector 522, via which the UE 500 may be, and sometimes is, coupled to a network node, e.g., a RAN node, a router, other node and/or the Internet, e.g., when located at a site where a fixed wired or optical connection is available, e.g., as an alternative to a wireless connection.

Memory 512 includes a control routine 554, an assembly of components 556, e.g., an assembly of software components, and data/information 558. The control routine 554 includes instructions, which when executed by processor 502 control UE 400 to implement basic operational functions, e.g., read memory, load instructions into the CPU, control an interface, etc. Assembly of components 556 includes, e.g., software routines, subroutines, modules, etc., which when implemented by a processor, e.g., processor 402, implement steps of an exemplary method, e.g., steps of the method of signaling diagram 200 of FIG. 2 and/or steps of the method of signaling diagram 300 of FIG. 3.

Data/information 558 includes a received instruction to perform measurements on neighbor cells and report 559, a received report request specifying RAT(s) and/or frequencies of interest 560, a predetermined signal strength threshold 561, detected signals 562, e.g. detected broadcast signals from neighboring base stations to be measured and/or decoded, e.g. a detected SSB conveying a PCI in PSS and SSS, a generated measurement report 564 including a PCI and measured received signal strength information, e.g., corresponding to a detected neighbor base station, a received report request 566 for information including a cell global identifier (NGCI/ECGI) and TDD configuration information, for a neighbor base station of interest (target base station), and a generated request for SIB1 568, e.g., to be sent to a target neighbor base station if a SIB1 is not detected from the target neighbor base station. Data/information 558 further includes received signals 570 from a target neighbor base station, e.g., a received SIB1, a decoded SIB1 information 572 including TDD configuration information, a cell global identifier and/or other information of interest, and a generated report 576 including a cell global identifier (NCGI/ECGI) and TDD configuration information corresponding to a target neighbor base station, e.g., to be sent to the first base station. Data/information 558 further includes request and report format information 578, e.g., to be used to generate, decode, and/or process request, reports, signals and/or messages. Data/information 580 further includes a current TDD configuration 580 being used by the first base station to communicate with UE 500, and a modified or new TDD configuration 582 to be used by the first base station to communicate with UE 500, e.g., the modified or new TDD configuration being based on updates due to first base station having received TDD configuration reports of neighbor base station, e.g., and making a decision to change its TDD configuration to control interference.

Figure 6:
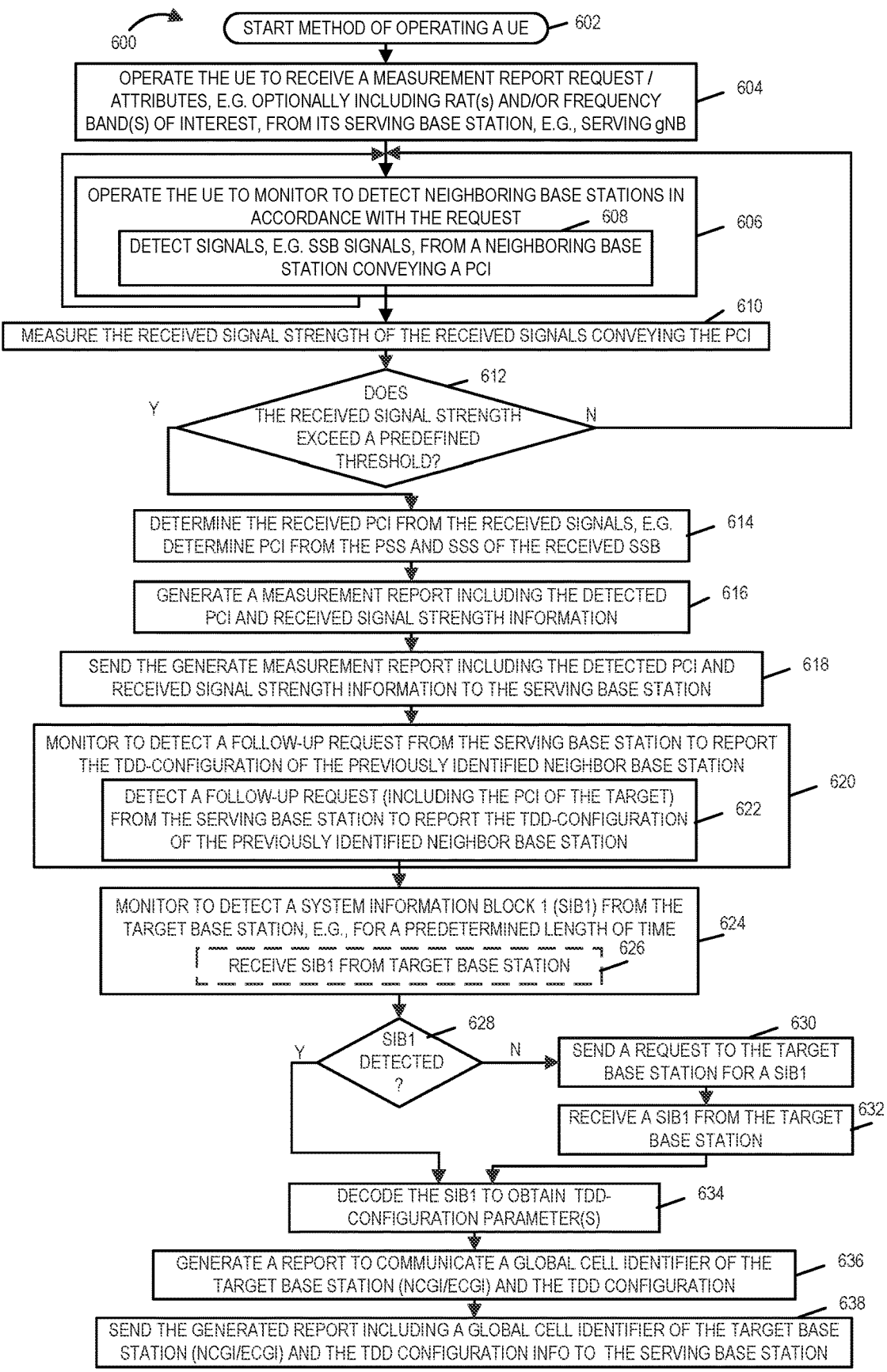
FIG. 6 is a flowchart an exemplary method of operating a user equipment (UE) in accordance with an exemplary.

FIG. 6 is a flowchart 600 an exemplary method of operating a user equipment (UE) in accordance with an exemplary. The UE implementing the method of flowchart 600 is, e.g., UE 1 606 or UE N 607 of FIGS. 1-3, and/or UE 500 of FIG. 5. Operation starts in step 602 in which the UE is powered on, initialized and establishes a radio connection with a serving base station, e.g., a gNB. The serving base station is, e.g., first base station 102 of FIGS. 1-3 and/or base station 400 of FIG. 4. Operation proceeds from start step 602 to step 604. In step 604 the UE receives a measurement report request/attributes, e.g., optionally including information specifying one or more radio access technologies (RAT(s)) and/or one or more frequency band(s) of interest, from its serving base station, e.g. its serving gNB. Operation proceeds from step 604 to step 606.

In step 606 the UE is operated to monitors to detect neighboring base station in accordance with the request. Step 606 is performed repetitively, on an ongoing basis. Step 606 may, and sometimes does, includes step 608, in which the UE detects signals, e.g., SSB signals, from a neighboring base station, e.g., base station 104 or base station 106, said detected signals conveying a physical cell identifier (PCI) of the neighboring base station, e.g., PCI=PCI_B or PCI_C.

In response to the detected signal of step 608, operation proceeds from step 608 to step 610. In step 610 the UE measures the received signal strength of the received signals conveying the PCI. Operation proceeds from step 610 to step 612.

In step 612 the UE compares the measured received signal strength to a predefined threshold. If the UE determines that the received signal strength does not exceed the predefined threshold, then operation proceeds from step 612 to the input of step 606 for additional monitoring. However, if the UE determines that the received signal strength exceeds the predefined threshold, then operation proceeds from step 612 to 614.

In step 614 the UE determined the received PCI form the received signals, e.g., the UE determines a PCI from the primary synchronization signal (PSS) and the secondary synchronization signal (SSS) of the synchronization signal block (SSB) signals. Operation proceeds from step 614 to step 616. In step 616 the UE generates a measurement report including the detected PCI and received signal strength information. Operation proceeds from step 616 to step 618.

In step 618 the UE sends, e.g., wirelessly transmits, the generated measurement report including the detected PCI and the received signal strength information to the serving base station. Operation proceeds from step 618 to step 620.

In step 620 the UE is operated to detect a follow-up request from the serving base station to report the Time-Division-Duplex (TDD) configuration of the preciously identified neighbor base station. Step 620 may, and sometimes does, include step 622, in which the UE detects a follow-up request (including the PCI of the target, e.g., PCI_B or PCI_C), from the serving base station to report the TDD configuration of the previously identified base station. Operation proceeds from step 622 to step 624.

In step 624 the UE monitors to detect a system information block 1 (SIB1) from the target base station, e.g., for a predetermined time. Step 624 may, and sometimes does includes step 626 in which the UE receives a SIB1 from the target neighbor base station. Operation proceeds from step 624 to step 628. In step 628, if a SIB1 has been detected, e.g., by receiving the SIB1 in step 626, then operation proceeds from step 628 to step 634. However, if a SIB1 has not been detected for the target base station, then operation proceeds from step 628 to step 630.

In step 630 the UE sends a request to target base station for a SIB 1. In step 632, the UE receives a SIB1 from the target base station, in response to the request of step 630. Operation proceeds from step 632 to step 634.

In step 634 the UE decodes the SIB1 to obtain TDD-configuration information, e.g., TDD configuration parameter(s). Alternatively, in some embodiments, the SIB1 is received by the UE along with the reception of the SSB, e.g., in step 608, and subsequently decoded to obtain the TDD configuration information, and then stored to be available for reporting when requested in step 622. Operation proceeds from step 634 to step 636.

In step 636 the UE generates a report to communicate a global cell identifier of the target neighbor base station, e.g., a NCGI or ECGI, and the TDD configuration being used by the target neighbor base station. Operation proceeds from step 636 to step 638.

In step 638 the UE sends, e.g., wireless transmits, the generated report including a global cell identifier, e.g., a NCGI or ECGI, and information communicating the TDD configuration being used by the target neighbor base station, e.g., information communicating a set of TDD configuration parameters.

Figure 7:
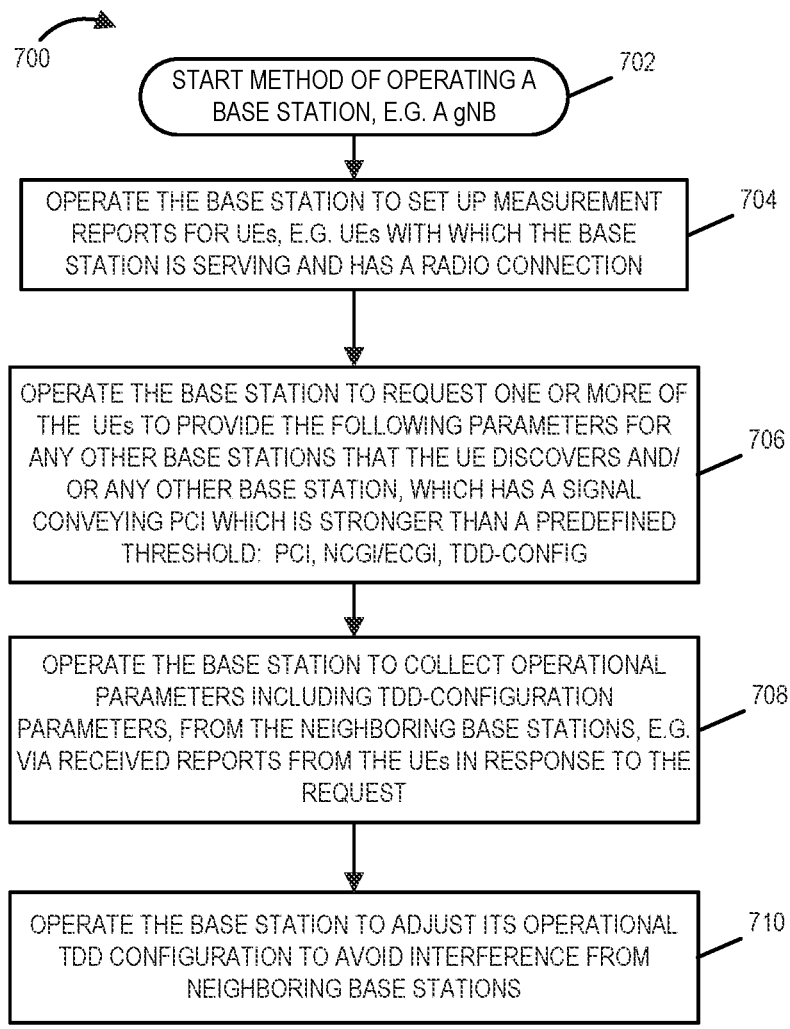
FIG. 7 is flowchart of an exemplary method of operating a base station, e.g., a gNB, in accordance with an exemplary embodiment.

FIG. 7 is flowchart 700 of an exemplary method of operating a base station, e.g., a gNB, in accordance with an exemplary embodiment. The base station implementing the method of flowchart 700 is, e.g., base station 102 of FIGS. 1-3 and/or base station 400 of FIG. 4. Operation of the exemplary method starts in step 702, in which the base station is powered on and initialized. Operation proceeds from start step 702 to step 704. In step 704 the base station is operated to set-up measurements reports for UEs, e.g., UEs with which the base station is operating as a serving base station and has a radio resource connection, e.g., UE 1 106 and UE N 107. Operation proceeds from step 704 to step 706.

In step 706 the base station is operated to request one or more of the UEs to provide the following parameters for any other base station, which has a signal conveying a PCI which is stronger than a predefined threshold: PCI, NCGI/ECGI, TDD-Configuration. In some embodiments, the request may, and sometimes does include an initial request for PCI and a follow up request for additional information including a global cell identifier (NCGI or ECGI) and TDD-Configuration information. In some embodiments a request is qualified, e.g., a filtered request, to one or more particular radio access technologies (RATs) and/or one or more particular frequency band(s) of interest. Operation proceeds from step 706 to step 708.

In step 708 the base station is operated to collect operational parameters including TDD-configuration parameters, from the neighboring base station, e.g., via received reports from the UEs in response to the requests. Operation proceeds from step 708 to step 710.

In step 710 the base station is operated to adjust is operational TDD configuration to avoid interference from neighboring base stations.

Figure 8:
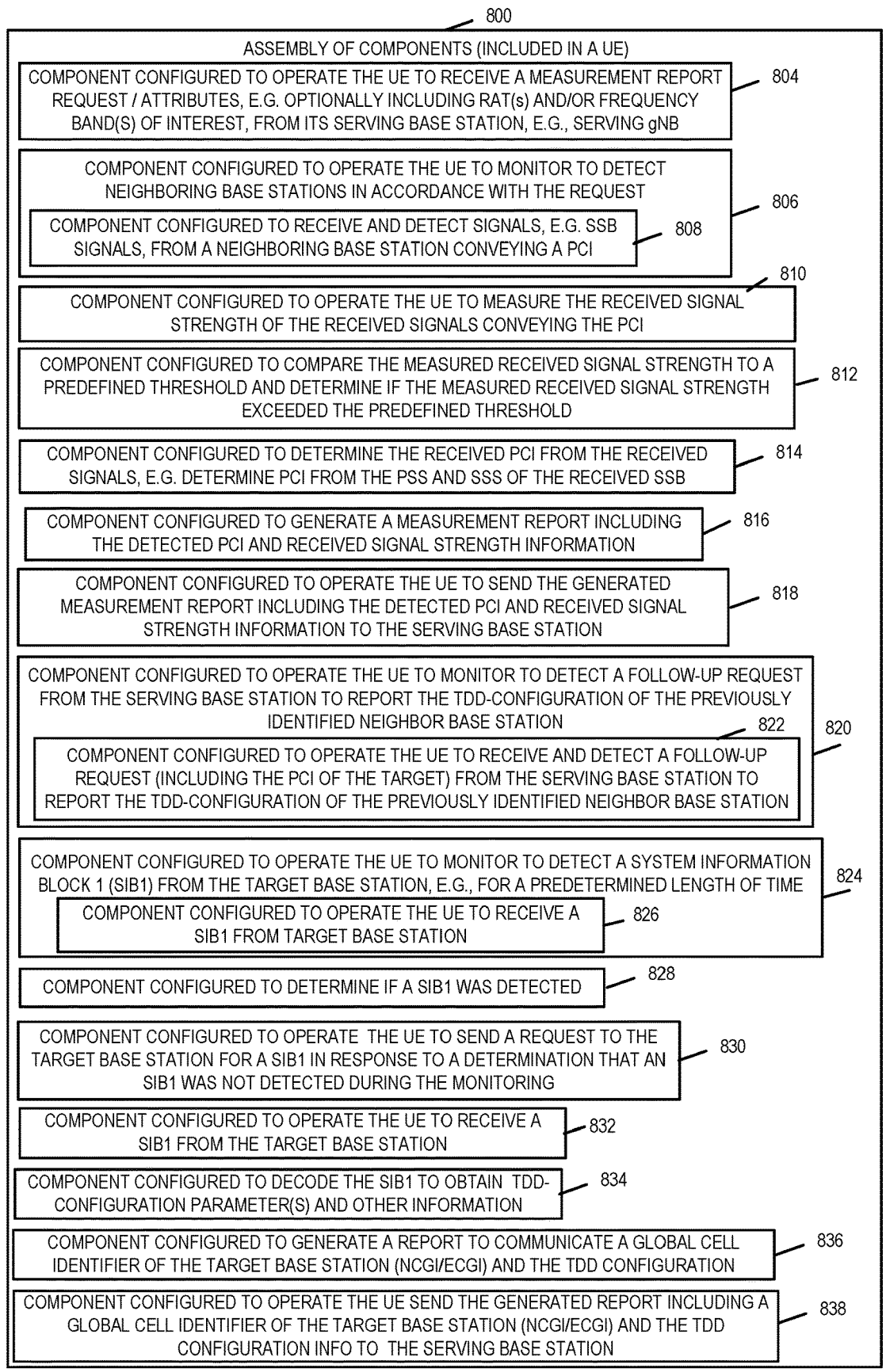
FIG. 8 is a drawing of an exemplary assembly of components which may be included in an exemplary UE in accordance with an exemplary embodiment.

FIG. 8 is a drawing of an exemplary assembly of components 800 which may be included in an exemplary user equipment (UE), e.g., UE 1 106 of FIGS. 1-3, UE N 107 of FIGS. 1-3, UE 500 of FIG. 5, and/or a UE implementing the method of flowchart 600 of FIG. 6, in accordance with an exemplary embodiment.

The components in the assembly of components 800 can, and in some embodiments are, implemented fully in hardware within a processor, e.g., processor 502, e.g., as individual circuits. The components in the assembly of components 800 can, and in some embodiments are, implemented fully in hardware within the assembly of hardware components 514, e.g., as individual circuits corresponding to the different components. In other embodiments some of the components are implemented, e.g., as circuits, within processor 502 with other components being implemented, e.g., as circuits within assembly of components 514, external to and coupled to the processor 502. As should be appreciated the level of integration of components on the processor and/or with some components being external to the processor may be one of design choice. Alternatively, rather than being implemented as circuits, all or some of the components may be implemented in software and stored in the memory 512 of the UE 500, with the components controlling operation of UE 500 to implement the functions corresponding to the components when the components are executed by a processor e.g., processor 502. In some such embodiments, the assembly of components 800 is included in the memory 512 as part of an assembly of software components 556. In still other embodiments, various components in assembly of components 800 are implemented as a combination of hardware and software, e.g., with another circuit external to the processor providing input to the processor which then under software control operates to perform a portion of a component's function.

When implemented in software the components include code, which when executed by a processor, e.g., processor 502, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 502, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE 500 or elements therein such as the processor 502, to perform the functions of corresponding steps illustrated and/or described in the method of one or more of the flowcharts, signaling diagrams and/or described with respect to any of the Figures. Thus, the assembly of components 800 includes various components that perform functions of corresponding one or more described and/or illustrated steps of an exemplary method, e.g., steps of the method of signaling diagram 200 of FIG. 2, steps of the method of signaling diagram 300 of FIG. 3, and/or steps of the method of flowchart 600 of FIG. 6.

Assembly of components 800 includes a component 804 configured to operate the UE to receive a measurement report request/attributes, e.g. optionally including information identifying RAT(s) and/or frequency band(s) of interest, from a serving base station, e.g. a gNB providing service to the UE, and a component 808 configured to operate the UE to monitor to detect neighboring base stations in accordance with the request. Component 806 includes a component 808 configured to receive and detect signals, e.g., SSB signals from a neighboring base station conveying a PCI.

Assembly of components 800 further includes a component 810 configured to operate the UE to measure the received signal strength of the received signals conveying the PCI, a component 812 configured to compare the measured received signal strength to a predefined threshold and determine if the measured received signal strength exceeds the predetermined threshold, a component 814 configured to determine the received PCI from the received signals, e.g., determine a PCI value from the PSS and SSS of the received SSB, a component 816 configured to generate a measurement report including the detected PCI and received signal strength, and a component 818 configured to operate the UE to send the generated measurement report including the detected PCI and the received signal strength information to the serving base station.

Assembly of components 800 further includes a component 820 configured to operate the UE to monitor to detect a follow-up request from the serving base station to report the TDD-configuration of the previously identified neighbor base station. Component 820 includes a component 822 configured to operate the UE to receive and detect a follow-up request (including the PCI of the target) from the serving base station to report the TDD-configuration of the previously identified neighbor base station.

Assembly of components 800 further includes a component 824 configured to operate the UE to monitor to detect a system information block 1 (SIB1) from the target base station, e.g., for a predetermined length of time. Component 824 includes a component 826 configured to operate the UE to receive a SIB1 from the target base station. Assembly of components 800 further includes a component 828 configured to determine if a SIB1 was detected and to control operation as a function of the determination, a component 820 configured to operate the UE to send a request to the target base station for a SIB1 in response to a determination that a SIB1 was not detected during the monitoring, a component 834 configured to operate the UE to received a SIB1 from the target base station in response to the request for a SIB1, a component 834 configured to decode the SIB1 to obtain TDD-configuration parameter(s) and other information, a component 836 configured to generate a report to communicate a global cell identifier of the target base station (NCGI/ECGI) and the TDD configuration information, and a component 838 configured to operate the UE to send the generated report included a global cell identifier (NCGI/ECGI) of the target base station and the TDD configuration information for the target base station to the serving base station.

In some embodiments, assembly of components 800 includes a set of components configured to implement the steps performed by UE 106 of the signaling diagram 200 of FIG. 2, e.g., one component for each of the steps of the method performed by UE 106 in the example of signaling diagram 200. In some embodiments, assembly of components 800 includes a set of components configured to implement the steps performed by UE 106 of the signaling diagram 300 of FIG. 3, e.g., one component for each of the steps of the method performed by UE 106 in the example of signaling diagram 300.

Figure 9:
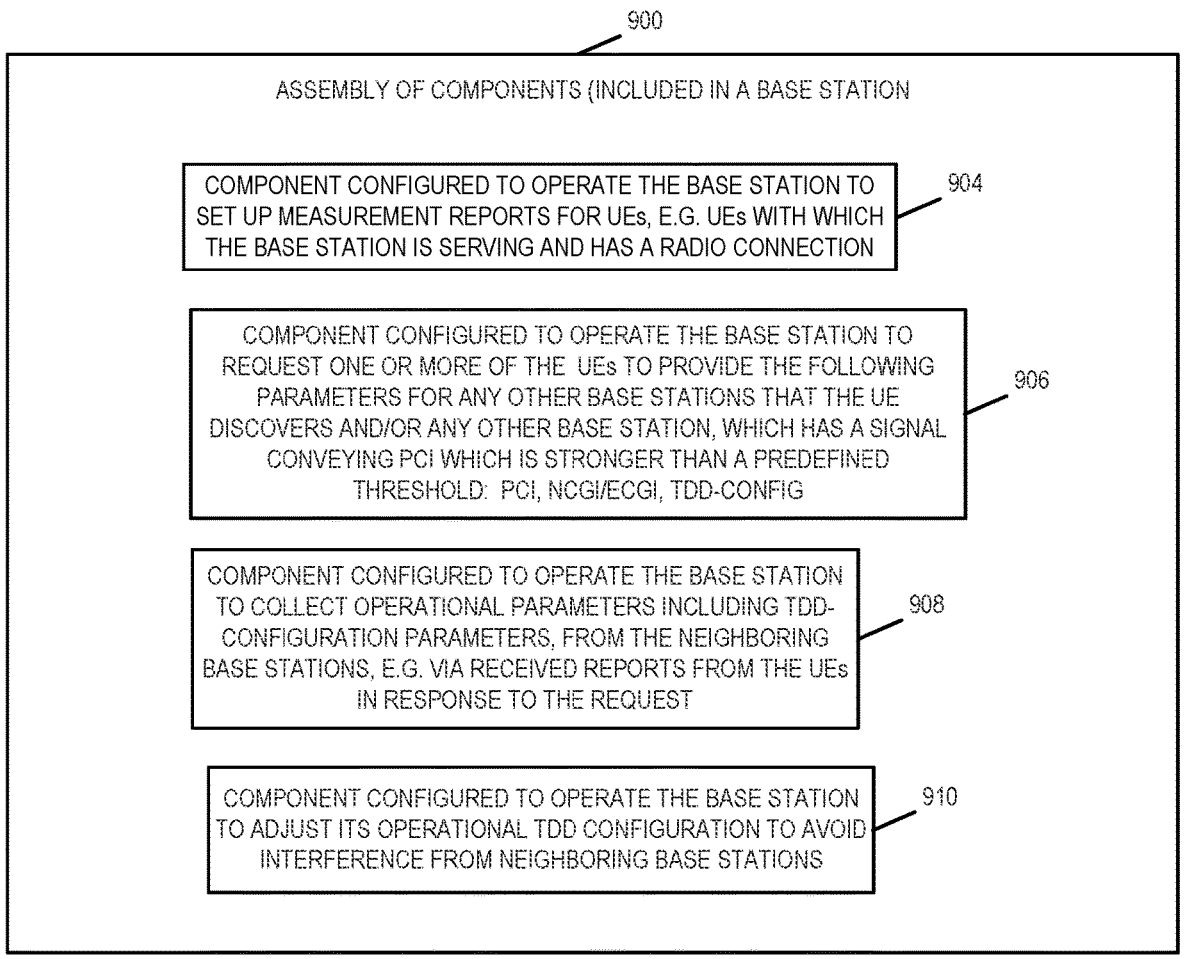
FIG. 9 is a drawing of an exemplary assembly of components which may be included in an exemplary base station in accordance with an exemplary embodiment.

FIG. 9 is a drawing of an exemplary assembly of components 900 which may be included in an exemplary base station, e.g., base station 1 102 of FIGS. 1-3, base station 2 104, of FIGS. 1-3, base station 400 of FIG. 4, and/or a base station implementing the method of flowchart 700 of FIG. 7, in accordance with an exemplary embodiment.

The components in the assembly of components 900 can, and in some embodiments are, implemented fully in hardware within a processor, e.g., processor 402, e.g., as individual circuits. The components in the assembly of components 900 can, and in some embodiments are, implemented fully in hardware within the assembly of hardware components 408, e.g., as individual circuits corresponding to the different components. In other embodiments some of the components are implemented, e.g., as circuits, within processor 402 with other components being implemented, e.g., as circuits within assembly of components 408, external to and coupled to the processor 402. As should be appreciated the level of integration of components on the processor and/or with some components being external to the processor may be one of design choice. Alternatively, rather than being implemented as circuits, all or some of the components may be implemented in software and stored in the memory 410 of the base station 400, with the components controlling operation of base station 400 to implement the functions corresponding to the components when the components are executed by a processor e.g., processor 402. In some such embodiments, the assembly of components 900 is included in the memory 410 as part of an assembly of software components 430. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor, e.g., processor 402, configure the processor to implement the function corresponding to the component. In embodiments where the assembly of components 900 is stored in the memory 410, the memory 410 is a computer program product comprising a computer readable medium comprising code, e.g., individual code for each component, for causing at least one computer, e.g., processor 402, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the base station 400 or elements therein such as the processor 402, to perform the functions of corresponding steps illustrated and/or described in the method of one or more of the flowcharts, signaling diagrams and/or described with respect to any of the Figures. Thus, the assembly of components 900 includes various components that perform functions of corresponding one or more described and/or illustrated steps of an exemplary method, e.g., steps of the method of signaling diagram 200 of FIG. 2, steps of the method of signaling diagram 300 of FIG. 3, and/or steps of the method of flowchart 700 of FIG. 7.

Assembly of components 900 includes a component 904 configured to operate the base station to set up measurement reports for UEs, e.g., UEs with which the base station is serving and has a radio resource connection, a component 906 configured to operate the base station to request one of more or all of the UEs to provide the following parameters for any other base station that the UE discovers and/or any other base station, which has a signal conveying a PCI which is stronger than a predefined threshold: PCI, NCGI(s)/ECGI(s), TDD-configuration. In some embodiments, the request may, and sometimes does, include an initial request for PCI and a follow up request for additional information including a global cell identifier (NCGI or ECGI) and TDD-Configuration information. In some embodiments a request is qualified, e.g., a filtered request, to one or more particular radio access technologies (RATs) and/or one or more particular frequency band(s) of interest. Assembly of components 900 further includes a component 908 configured to operate the base station to collect operational parameters from the neighboring base stations, e.g., via received reports from the UEs in response to the request, and a component 910 configured to operate the base station to adjust its operational TDD configuration to avoid interference from neighboring base stations.

In some embodiments, assembly of components 900 includes a set of components configured to implement the steps performed by first base station 102 of the signaling diagram 200 of FIG. 2, e.g., one component for each of the steps of the method performed by first base station 102 in the example of signaling diagram 200. In some embodiments, assembly of components 900 includes a set of components configured to implement the steps performed by first base station 102 of the signaling diagram 300 of FIG. 3, e.g., one component for each of the steps of the method performed by first base station 102 in the example of signaling diagram 300.

Various aspects and/or features of some embodiments of the present invention are described below using syntax which is the same or similar to that used in in public document 3rd Generation Partnership Project; Technical Specification Group Radio Access Network; NR; Radio Resource Control (RRC) protocol specification, 3GPP TS 38.331 V16.7.0 (2021-12) which is hereby expressly incorporated by reference in its entirety and which will hereinafter be referred to as Reference 38.331.

TDD configuration in SIB1 in some embodiments is as follows:
    SIB1->servingCellConfigCommonSIB->tdd-UL-DL-
        ConfigurationCommon
        A reference sub-carrier spacing configuration represented by the numerology "mu"
        Period P msec (0.625, 1, 1.25, 2, 2.5, 3, 4, 5 or 10 msec) during which it defines a number of downlink/uplink slots/symbols (dsym, dslots, usym, uslots)
tdd-UL-DL-ConfigurationDedicated=>ServingCellConfig type=>SpCellConfig IE or sCellConfig IE, both of which are optional IE of CellGroupConfig IE, which can be part of RRCSetup, RRCResume, RRCReconfiguration messages
(See Reference 38.331) a full citation to which is included later in this application) The IE TDD-UL-DL-Config-Common determines the cell specific UL/DL TDD configuration.
TDD-UL-DL-ConfigCommon Information Element physical IDs (e.g., NR CGI/NR PCI, ECGI/PCI) of the target cell; ii) has an entry in the NCRT for the source cell identifying the target cell; and iii) has the attributes in this NCRT entry defined, either by OAM or set to default values.

NCRs are cell-to-cell relations, while an Xn link is set up between two gNBs. Neighbour Cell Relations are unidirectional, while an Xn link is bidirectional.

The ANR function also allows Operations, Administration and Maintenance (OAM) to manage the NCRT. OAM can add and delete NCRs. It can also change the attributes of the NCRT. The OAM system is informed about changes in the NCRT.

```
-- ASN1START
-- TAG-TDD-UL-DL-CONFIGCOMMON-START
TDD-UL-DL-ConfigCommon ::=            SEQUENCE {
    referenceSubcarrierSpacing            SubcarrierSpacing,
    pattern1                              TDD-UL-DL-Pattern,
    pattern2                              TDD-UL-DL-Pattern
OPTIONAL, -- Need R
    ...
}
TDD-UL-DL-Pattern ::=                 SEQUENCE {
    dl-UL-TransmissionPeriodicity         ENUMERATED {ms0p5, ms0p625, ms1,
ms1p25, ms2, ms2p5, ms5, ms10},
    nrofDownlinkSlots                     INTEGER (0..maxNrofSlots),
    nrofDownlinkSymbols                   INTEGER (0..maxNrofSymbols-1),
    nrofUplinkSlots                   INTEGER (0..maxNrofSlots),
    nrofUplinkSymbols                     INTEGER (0..maxNrofSymbols-1),
    ...,
    [[
    dl-UL-TransmissionPeriodicity-v1530   ENUMERATED {ms3, ms4}
OPTIONAL -- Need R
    ]]
}
-- TAG-TDD-UL-DL-CONFIGCOMMON-STOP
-- ASN1STOP
```

In an exemplary method, in accordance with the present invention, a base station gradually learns about the TDD configuration of its nearby cells by the help of user equipment's (UEs).

In some embodiments, a UE upon detection of a new cell's SSB is operated to further detect and decode its SIB1 and record the TDD configuration of the cell. The discovered TDD configuration may be, and sometimes is, sent to its associated network via messaging that ANR procedure provides. Additional novel messaging and/or data collection with regard to ANR is implemented in various embodiments, e.g., to facilitate and implement the collection of TDD information. Additional novel messaging to ANR, in accordance with some embodiments of the present invention, is indicated by boldface text and underlining in the descriptions below.

Neighbour and neighbor are alternative spellings for the same word and may be used interchangeably at various locations in the present application.

Automatic neighbour cell relation (ANR) is an existing function that relieves mobile operators from the burden of manually managing neighbour cell relation (NCR). The ANR function resides in the gNB and manages the Neighbour Cell Relation Table (NCRT). Located within ANR, the Neighbour Detection Function finds new neighbours and adds them to the NCRT. ANR also contains the Neighbour Removal Function which removes outdated NCRs. The Neighbour Detection Function and the Neighbour Removal Function are implementation specific.

An existing NCR from a source cell to a target cell means that gNB controlling the source cell: i) knows the global and In the baseline specification, ANR relies on NR Cell Global Identifier (NCGI) and ANR reporting of E-UTRA cells as specified in TS 36.300 (for LTE) or 38.300 (for NR).

In various embodiments, in accordance with the present invention, the ANR function is enhanced to include some additional aspects such as TDD configuration.

FIG. 2, comprising the combination of FIG. 2A and FIG. 2B, shows an example where the NG-RAN node 102 serving cell A has an ANR function. In RRC CONNECTED, the NG-RAN node 102 instructs each UE (e.g., UE 106) to perform measurements on neighbour cells. The NG-RAN node 102 may use different policies for instructing the UE 106 to do measurements, and when to report them to the NG-RAN node 102.

The UE 106, in step 224, sends a measurement report regarding cell B to NG-RAN node 102. This report contains Cell B's PCI, but not its NCGI/ECGI.

When the NG-RAN node 102 receives a UE measurement report containing the PCI, the following sequence may be, and sometimes is, used.

The NG-RAN node 102, in step 234, instructs the UE 106, using the newly discovered PCI as parameter, to read all the broadcast NCGI(s)/ECGI(s), TAC(s), RANAC(s), PLMN ID(s), NR frequency band(s) and the NR TDD-UL-DL-configuration. To do so, the NG-RAN node 102 may need to, and sometimes does, schedule, in step 232, appropriate idle periods to allow the UE 106 to read the NCGI/ECGI from the broadcast channel of the detected neighbour cell.

When the UE 106 has found out the new cell's NCGI(s)/ECGI(s), the UE 106 reports, in step 254, all the broadcast NCGI(s)/ECGI(s) to the serving cell NG-RAN node 102. In addition, the UE reports, in step 254, all the tracking area code(s), RANAC(s), PLMN IDs and, for neighbour NR cells, NR frequency band(s), and NR TDD-UL-DL-configuration that have been read by the UE. In case the detected NR cell (e.g., NG-RAN node 104) does not broadcast SIB1, the UE 106 may report noSIB1 indication as specified in Reference 38.331.

Alternatively, the UE 106, in step 240, may, and in some embodiments does, request SIB1 from the neighbouring cell.

The NG-RAN node 102, in step 260, decides to add this neighbour relation, and can, in step 262, use PCI and NCGI(s)/ECGI(s) to: i) lookup a transport layer address to the new NG-RAN node; ii) update the Neighbour Cell Relation List; iii) if needed, setup a new Xn interface towards this NG-RAN node 102; and iv) update the neighbour cell list with the new NR TDD-UL-DL-configuration.

For Inter-system ANR, each cell contains an Inter Frequency Search list. This list contains all frequencies that shall be searched. FIG. 3 depicts an example where the NG-RAN node 102 serving cell A has an ANR function.

A UE measurement report structure in accordance with the invention will now be described using Pseudo code and syntax generally consistent with that of Reference 38.331. The following measurement and reporting structure shown using pseudo code and syntax is similar to that of 38.331 but includes various modifications which facilitate neighing cell/base station TDD configuration information discovery, communication of such information and/or use of such information. which is the same or similar to the pseudo code and syntax used in Reference 38.331. Some of the changes and improvements over what is shown in Reference 38.331 are shown using bold and/or underlining.

5.5 Measurements

The network may configure an RRC_CONNECTED UE to perform measurements. The network may configure the UE to report them in accordance with the measurement configuration or perform conditional reconfiguration evaluation in accordance with conditional reconfiguration. The measurement configuration is provided by means of dedicated signaling i.e., using the RRCReconfiguration of RRCResume.

The network may configure the UE to report the following measurement information based on SIB1 message:
TDD-UP-DL-configuration per cell based SIB1;
SIB1->servingCellConfigCommonSIB->tdd-UL-DL0ConfigurationCommon 5.5.3 Performing Measurements The UE shall:
1> whenever the UE has a measConfig, perform RSRP and RSRQ measurements for each serving cell for which servingCellMO is configured as follows:
. . .
   1> for each serving cell for which servingCellMO is configured, if the reportConfig associated with at least one measId included in the measIdList within VarMeasConfig contains SINR as trigger quantity and/or reporting quantity:
. . .
   1> for each measId included in the measIdList within VarMeasConfig:
      2> if the reportType for the associated reportConfig is set to reportCGI or ReportCGIandTDDConfig and timer T321 is running:
         3> if useAutonomousGaps is configured for the associated reportConfig:
            4> perform the corresponding measurements on the frequency and RAT indicated in the associated measObject using autonomous gaps as necessary;
         3> else:
            4> perform the corresponding measurements on the frequency and RAT indicated in the associated measObject using available idle periods;
         3> if the cell indicated by reportCGI or ReportCGIandTDDConfig field for the associated measObject is an NR cell and that indicated cell is broadcasting SIB1 (see 3rd Generation Partnership Project Technical Specification Group Radio Access Network; NR; Physical Layer Procedures for Control 3GPP TS 38.213 V16.7.0 (2021-09) which is hereby expressly incorporated by reference in its entirety and which is hereafter referred to as TS) or the UE shall set the contents of DedicatedSIBRequest message in accordance with 5.2.2.3.6
            4> try to acquire SIB1 in the concerned cell;
         3> if the cell indicated by reportCGI or ReportCGIandTDDConfig field is an E-UTRA cell:
            4> try to acquire SystemInformationBlock-Type1 in the concerned cell;

5.5.5 Measurement Report Triggering

If AS security has been activated successfully, the UE shall:
1> for each measId included in the measIdList within VarMeasConfig:
. . .
2> else if the corresponding reportConfig includes a reportType set to reportCGI or ReportCGIandTDDConfig:
   3> consider the cell detected on the associated measObject which has a physical cell identity matching the value of the cellForWhichToReportCGI or cellForWhichToReportCGIandTDDConfig included in the corresponding reportConfig within the VarMeasConfig to be applicable;
. . .
2> if reportType is set to reportCGI or reportCGIandTDDConfig:
   3> if the UE acquired the SIB1 or SystemInformationBlockType1 for the requested cell; or
   3> if the UE detects that the requested NR cell is not transmitting SIB1 (see TS 38.213 [13], clause 13):
      4> stop timer T321;
      4> include a measurement reporting entry within the VarMeasReportList for this measId;
      4> set the numberOfReportsSent defined within the VarMeasReportList for this measId to 0;
      4> initiate the measurement reporting procedure, as specified in 5.5.5;

5.5.5 Measurement Reporting

The purpose of this procedure is to transfer measurement results from the UE to the network. The UE shall initiate this procedure only after successful AS security activation.

For the measId for which the measurement reporting procedure was triggered, the UE shall set the measResults within the MeasurementReport message as follows:

1>   set the *measId* to the measurement identity that triggered the measurement reporting

...

1>   if there is at least one applicable neighbouring cell to report:

...

~~2>~~   if the *reportType* is set to *eventTriggered* or *periodical*:

...

>2   else
   3>   if the cell indicated by *cellForWhichToReportCGI* or cellForWhich ToReporCGIandt TDDConfig is an NR cell:
      4>   if *plmn-IdentityInfoList* of the *cgi-Info* for the concerned cell has been obtained:
         5>   include the *plmn-IdentityInfoList* including *plmn-IdentityList*, *trackingAreaCode* (if available), *ranac* (if available), *cellIdentity* and *cellReservedForOperatorUse* for each entry of the *plmn-IdentityInfoList*;
         5>   include *frequencyBandList* if available;
      4>   if *nr-CGI-Reporting-NPN* is supported by the UE and *npn-IdentityInfoList* of the *cgi-Info* for the concerned cell has been obtained:
         5>   include the *npn-IdentityInfoList* including *npn-IdentityList*, *trackingAreaCode*, *ranac* (if available), *cellIdentity* and *cellReservedForOperatorUse* for each entry of the *npn-IdentityInfoList*;
         5>   include *cellReservedForOtherUse* if available;
      4>   else if *MIB* indicates the *SIB1* is not broadcast:
         5>   include the *noSIB1* including the *ssb-SubcarrierOffset* and *pdcch-ConfigSIB1* obtained from *MIB* of the concerned cell;
   3>   if the cell indicated by the cellForWhichToReportCGIandTDDConfig is a NR cell:
      4>   if tdd-UL-DL-ConfigurationCommon has been obtained include it in the MeasResults
   3>   if the cell indicated by *cellForWhichtoReportCGI* or cellForWhichToReport CGIandTDDConfig is an E-EUTRA cell:
      4>   if all mandatory fields of the *cgi-Info-EPC* for the concerned cell have been obtained:
         5>   include in the *cgi-Info-EPC* the fields broadcasted in E-UTRA *SystemInformationBlockType1* associated to EPC;
      4>   if the UE is E-UTRA/5GC capable and all mandatory fields of the *cgi-Info-5GC* for the concerned cell have been obtained:
         5>   include in the *cgi-Info-5GC* the fields broadcasted in E-UTRA *SystemInformationBlockType1* associated to 5GC;
      4>   if the mandatory present fields for the *cgi-Info* for the cell indicated by the *cellForWhichToReportCGI* or cellForWhich ToReporCGI andtTDDConfig in the associated *measObject* have been obtained:
         5>   include the *freqBandIndicator*;
         5>   if the cell broadcasts the *multiBandInfoList*, include the *multiBandInfoList*;
         5>   if the cell broadcasts the *freqBandIndicatorPioroty*, include the *freqBandIndicatorPriority*;
   3>   if the cell indicated by the cellForWhichToReportCGIandTDDConfig is a E-UTRA cell:
      4>   if tdd-Frame-Configuration has been obtained include it in the MeasResults *ReportConfigNR* information element The IE *ReportConfigNR* specifies criteria for triggering of an NR measurement reporting event or of a CHO or CPC event. For events labelled AN with N equal to 1, 2 and so on, measurement reporting events and CHO or CPC events are based on cell measurement results, which can either be derived based on SS/PBCH block or CSI-RS.

-- ASN1START
-- TAG-REPORTCONFIGNR-START

```
ReportConfigNR ::=           SEQUENCE {
  reportType       CHOICE {
    periodical              PeriodicalReportConfig,
    eventTriggered          EventTriggerConfig,
    ...,
    reportCGI               ReportCGI,
    ReportCGIandTDDConfig   ReportCGIandTDDConfig
    reportSFTD              ReportSFTD-NR,
    condTriggerConfig-r16   CondTriggerConfig-r16,
    cli-Periodical-r16      CLI-PeriodicalReportConfig-r16,
    cli-EventTriggered-r16  CLI-EventTriggerConfig-r16
  }
}
```

-continued

```
ReportCGI ::=                       SEQUENCE {
   cellForWhichToReportCGI              PhysCellId,
   ...,
   [[
   useAutonomousGaps-r16                ENUMERATED {setup}
OPTIONAL, -- Need R
   ]]
}
```

ReportCGIandTDDConfig ::=          SEQUENCE {
 cellForWhichToReportCGIandTDDConfig     PhysCellId,
   ...,
   [[
   useAutonomousGaps-r16        ENUMERATED {setup}
OPTIONAL, -- Need R
   ]]
}
...
-- TAG-REPORTCONFIGNR-STOP
-- ASN1STOP The IEMeasResults covers measured results for intra-frequency, inter-frequency, inter-RAT mobility and measured results for sidelink.

MeasResults Information Element

```
-- ASN1START
-- TAG-MEASRESULTS-START
MeasResults ::=                  SEQUENCE {
   measId                           MeasId,
   measResultServingMOList              MeasResultServMOList,
   measResultNeighCells             CHOICE {
      measResultListNR                  MeasResultListNR,
      ...,
      measResultListEUTRA               MeasResultListEUTRA,
      measResultListUTRA-FDD-r16            MeasResultListUTRA-FDD-r16
   }
OPTIONAL,
   ...,
```

MeasResultListNR ::= SEQUENCE (SIZE (1..maxCellReport)) OF MeasResultNR

```
MeasResultNR ::=             SEQUENCE {
   physCellId                PhysCellId
OPTIONAL,
   measResult                SEQUENCE {
      cellResults               SEQUENCE{
         resultsSSB-Cell              MeasQuantityResults
OPTIONAL,
         resultsCSI-RS-Cell              MeasQuantityResults
OPTIONAL
      },
      rsIndexResults            SEQUENCE{
         resultsSSB-Indexes              ResultsPerSSB-IndexList
OPTIONAL,
         resultsCSI-RS-Indexes              ResultsPerCSI-RS-IndexList
OPTIONAL
      }
OPTIONAL
   },
   ...,
   [[
   cgi-Info              CGI-InfoNR
OPTIONAL
   ]]
```
   tdd-UL-DL-ConfigurationCommon            TDD-UL-DL-
Configuration Common
           OPTIONAL,
}
```
MeasResultListEUTRA ::=           SEQUENCE (SIZE (1..maxCellReport))
OF MeasResultEUTRA
MeasResultEUTRA ::=           SEQUENCE {
   eutra-PhysCellId              PhysCellId,
   measResult                MeasQuantityResultsEUTRA,
   cgi-Info                CGI-InfoEUTRA
OPTIONAL,
   ...
```

-continued

| tdd-Frame-Configuration | TDD-Frame-Configuration OPTIONAL, |

}
...
-- TAG-MEASRESULTS-STOP
-- ASN1STOP
*MeasResultNR* field descriptions
...
    *physCellId*
    The physical cell identity of the NR cell for which the reporting is
    being performed.
    *tdd-UL-DL-ConfigurationCommon*
    The TDD configuration of the NR cell for which the reporting is being
    performed.
    *tdd-Frame-Configuration*
    The TDD configuration of the EUTRA cell for which the reporting is
    being performed.
...

First Numbered List of Exemplary Method Embodiments

Method Embodiment 1. A method of operating a first base station (102), the method comprising: sending (234 or 336) to a first user equipment (UE) a request for information on neighboring base station time division duplexing (TDD) information; and receiving (258 or 360) from the first UE a first report including first neighbor cell identification information and first neighbor cell TDD configuration information corresponding to a first neighboring base station.

Method Embodiment 2. The method of Method Embodiment 1, further comprising: making a TDD resource allocation (264 or 366) based on the received first neighbor cell TDD configuration information received from the first UE (e.g. schedule TDD so that downlink transmission coincide with that of one or more neighbor cells including the first neighboring cell and/or schedule uplink transmissions so that they occur when downlink transmissions of neighboring cell and/or flexible slots in neighboring cell occur—e.g., to avoid interference from other base station downlinks when UEs are trying to transmit uplink signals to the first base station).

Method Embodiment 3. The method of Method Embodiment 1, wherein the first neighboring base station (104) and first neighbor cell (015) are part of the same network as the first base station (102) and the first cell (103) (e.g., as shown in the FIG. 2 example).

Method Embodiment 3A The method of Method Embodiment 1, wherein the first neighboring base station (108) and first neighbor cell (109) are part of a different network than the network of the first base station (102) and first cell (103) (e.g., as shown in the FIG. 3 example).

Method Embodiment 4. The method of Method Embodiment 2, further comprising, prior to sending (234 or 336) to first user equipment (UE) a request for information on neighboring base station time division duplexing (TDD) information, the steps of: sending (202 or 306) an instruction to the first UE to report at least some neighbor base station information; and receiving (228 or 332), from the first UE a report (226 or 330) including cell information corresponding to the first neighbor cell but not including cell timing division duplex (TDD) configuration information.

Method Embodiment 4A. The method of Method Embodiment 4, wherein sending (202 or 306) an instruction to the first UE to report neighbor base station information includes sending (202) an instruction (204) to perform measurements on signals received from neighbor cells and to report back measurement information; and wherein receiving (228 or 332) a report (226 or 330) including cell information includes receiving (228) a measurement report (226) including cell identification information (e.g., PCI) and corresponding signal strength information (e.g., measured strength of a signal from the first neighbor cell).

Method Embodiment 4B. The method of Method Embodiment 4, wherein sending (202 or 306) an instruction to the first user equipment to report neighbor base station information includes sending (306) a report neighbor request (308) including information indicating a radio access technology (RAT) to be searched to discover neighbor base stations and one or more frequency bands to be search when searching for base stations corresponding to the indicated RAT; and wherein receiving (228 or 332) a report (226 or 330) including cell information includes receiving a report (330) in the form of a neighbor response measurement report including one or more PCIs of neighboring base stations detected as part of the requested search.

Method Embodiment 4C. The method of Method Embodiment 4B, wherein the RAT to be searched is New Radio (NR).

Method Embodiment 4C1. The method of Method Embodiment 4B, wherein the RAT to be searched is Long Term Evolution (LTE) (e.g., Evolved Universal Terrestrial (E-UTRAN)).

Method Embodiment 4D. The method of Method Embodiment 4B, wherein a frequency band to be searched in a shared frequency band.

Method Embodiment 4E. The method of Method Embodiment 4B, wherein a frequency band to be searched is unlicensed spectrum.

Method Embodiment 5. The method of Method Embodiment 4, wherein said received report (226 or 330), including cell information corresponding to the first neighbor cell but not including cell timing division duplex (TDD) configuration information, includes received signal power information for a signal (e.g., a broadcast signals conveying a Synchronization Signal Block (SSB)) received from said first neighboring base station; and wherein the request (sent in step 234 or 336) for information on neighboring base station time division duplexing (TDD) information includes a base station identifier (e.g., a PCI) for the first neighboring base station.

Method Embodiment 5A. The method of Method Embodiment 5, wherein the request (sent in step 234 or 336) for information on neighboring base station time division duplexing (TDD) information is part of a request for information on the neighboring base station which further requests a global cell identifier (New Radio Cell Global Identifier (NCGI) (in 5G NR) or EUTRA Cell Global Identifier (ECGI) (in 4G LTE)) for the first neighboring base station.

Method Embodiment 5B. The method of Method Embodiment 5A, wherein the request (sent in step 234 or 336) for information on neighboring base station time division duplexing (TDD) information is part of a request for information on the neighboring base station which further requests one of more of: a Tracking Area Code (TAC), a Radio Access Network Notification Area Code (RANAC), a Public Land Mobile Network (PLMN) ID, or a frequency band for the first neighboring base station.

Method Embodiment 6. The method of Method Embodiment 4, further comprising: scheduling (232 or 334) one or more idle periods to provide periods in which the first UE can perform neighbor base station measurements; and implementing (239 or 341) the transmission schedule including operating the first base station to refrain from transmission during the scheduled idle periods (e.g., to allow measurements of neighboring base station signals without interference from transmissions from first base station).

Method Embodiment 7. The method of Method Embodiment 4, further comprising: updating (262 or 364) a neighbor cell list in the first base station with TDD-UL-DL configuration information for the first neighbor base station with received TDD configuration information (256 or 358).

First Numbered List of Exemplary Apparatus Embodiments

Apparatus Embodiment 1. A first base station (102 or 400), comprising: a wireless transmitter (414); a wireless receiver (412); and a processor (402) configured to: operate the first base station to send (234 or 336) (e.g., via wireless transmitter 414) to a first user equipment (UE) (106) a request for information on neighboring base station time division duplexing (TDD) information; and operate the first base station to receive (258 or 360) (e.g. via wireless receiver 411) from the first UE a first report including first neighbor cell identification information and first neighbor cell TDD configuration information corresponding to a first neighboring base station (e.g. 104 or 108).

Apparatus Embodiment 2. The first base station (102) of Apparatus Embodiment 1, wherein said processor 402 is further configured to make (264 or 366) a TDD resource allocation based on the received first neighbor cell TDD configuration information received from the first UE (e.g. schedule TDD so that downlink transmission coincide with that of one or more neighbor cells including the first neighboring cell and/or schedule uplink transmissions so that they occur when downlink transmissions of neighboring cell and/or flexible slots in neighboring cell occur—e.g., to avoid interference from other base station downlinks when UEs are trying to transmit uplink signals to the first base station).

Apparatus Embodiment 3. The first base station (102) of Apparatus Embodiment 1, wherein the first base station (102) and first neighboring base station (104) are part of the same network (e.g., as shown in the FIG. 2 example).

Apparatus Embodiment 3A The first base station (102) of Apparatus Embodiment 1, wherein the first base station (102) and first neighbor base station (108) are part of different networks (e.g., as shown in the FIG. 3 example).

Apparatus Embodiment 4. The first base station (102) of Apparatus Embodiment 2, wherein said processor (402) is further configured to operate the first base station (102) to perform, prior to sending (234 or 336) to first user equipment (UE) a request for information on neighboring base station time division duplexing (TDD) information, the steps of: sending (202 or 306) (e.g. via wireless transmitter 414) an instruction to the first UE to report at least some neighbor base station information; and receiving (228 or 332), (e.g., via wireless receiver 412) the first UE a report (226 or 330) including cell information corresponding to the first neighbor cell but not including cell timing division duplex (TDD) configuration information.

Apparatus Embodiment 4A1. The first base station (102) of Apparatus Embodiment 4, wherein said report (226 or 330) including cell information corresponding to the first neighbor cell does not include a cell global identifier (NCGI or ECGI).

Apparatus Embodiment 4A. The first base station (102) of Apparatus Embodiment 4, wherein said processor (402) is configured to operate the first base station (102) to send (202) (e.g., via transmitter 414) an instruction (204) to perform measurements on signals received from neighbor cells and to report back measurement information, as part of being configured to operate the first base station (100) to send (202 or 306) an instruction to the first UE to report neighbor base station information includes; and wherein said processor (402) is configured to operate the first base station (102) to receive (228) (e.g., via receiver 412) a measurement report (226) including cell identification information (e.g., PCI) and corresponding signal strength information (e.g., measured strength of a signal from the first neighbor cell), as part of being configured to operate the first base station (102) to receive (228 or 332) a report (226 or 330) including cell information.

Apparatus Embodiment 4B. The first base station (102) of Apparatus Embodiment 4, wherein said processor (402) is configured to operate the first base station (102) to send (306) (e.g., via transmitter 414) a report neighbor request (308) including information indicating a radio access technology (RAT) to be searched to discover neighbor base stations and one or more frequency bands to be search when searching for base stations corresponding to the indicated RAT, as part of being configured to operate the first base station to send (202 or 306) an instruction to the first user equipment to report neighbor base station information includes; and wherein said processor (402) is configured to operate the first base station (102) to receive a report (330) in the form of a neighbor response measurement report including one or more PCIs of neighboring base stations detected as part of the requested search, as part of being configured to operate the first base station (102) to receive (228 or 332) a report (226 or 330) including cell information.

Apparatus Embodiment 4C. The first base station (102) of Apparatus Embodiment 4B, wherein the RAT to be searched is New Radio (NR).

Apparatus Embodiment 4C1. The first base station of Apparatus Embodiment 4B, wherein the RAT to be searched is Long Term Evolution (LTE) (e.g., Evolved Universal Terrestrial (E-UTRAN)).

Apparatus Embodiment 4D. The first base station (102) of Apparatus Embodiment 4B, wherein a frequency band to be searched in a shared frequency band.

Apparatus Embodiment 4E. The first base station (102) of Apparatus Embodiment 4B, wherein a frequency band to be searched is unlicensed spectrum.

Apparatus Embodiment 5. The first base station (102) of Apparatus Embodiment 4, wherein said received report (226 or 330), including cell information corresponding to the first neighbor cell but not including cell timing division duplex (TDD) configuration information, includes received signal power information for a signal (e.g., a broadcast signals conveying a Synchronization Signal Block (SSB)) received from said first neighboring base station; and wherein the request (sent in step 234 or 336) for information on neighboring base station time division duplexing (TDD) information includes a base station identifier (e.g., a PCI) for the first neighboring base station.

Apparatus Embodiment 5A. The first base station (102) of Apparatus Embodiment 5, wherein the request (sent in step 234 or 336) for information on neighboring base station time division duplexing (TDD) information is part of a request for information on the neighboring base station which further requests a global cell identifier (New Radio Cell Global Identifier (NCGI) (in 5G NR) or EUTRA Cell Global Identifier (ECGI) (in 4G LTE) for the first neighboring base station.

Apparatus Embodiment 5B. The first base station (102) of Apparatus Embodiment 5A, wherein the request (sent in step 234 or 336) for information on neighboring base station time division duplexing (TDD) information is part of a request for information on the neighboring base station which further requests one of more of: a Tracking Area Code (TAC), a Radio Access Network Notification Area Code (RANAC), a Public Land Mobile Network (PLMN) ID, or a frequency band for the first neighboring base station.

Apparatus Embodiment 6. The first base station (102) of Apparatus Embodiment 4, wherein said processor (402) is further configured to operate the first base station (102) to: schedule (232 or 334) one or more idle periods to provide periods in which the first UE can perform neighbor base station measurements; and implement (239 or 341) the transmission schedule including operating the first base station to refrain from transmission during the scheduled idle periods (e.g., to allow measurements of neighboring base station signals without interference from transmissions from first base station).

Apparatus Embodiment 7. The first base station (102) of claim 4, wherein said processor (402) is further configured to: update (262 or 364) a neighbor cell list in the first base station with TDD-UL-DL configuration information for the first neighbor base station with received TDD configuration information (256 or 358).

First Numbered List of Exemplary Non-Transitory Computer Readable Medium Embodiments Non-Transitory Computer Readable Medium Embodiment 1. A non-transitory computer readable medium (410) including machine executable instructions, which when executed by a processor (402) of a first base station (102 or 400), cause the first base station (102 or 400) to perform the steps of: sending (234 or 336) to a first user equipment (UE) a request for information on neighboring base station time division duplexing (TDD) information; and receiving (258 or 360) from the first UE a first report including first neighbor cell identification information and first neighbor cell TDD configuration information corresponding to a first neighboring base station.

Second Numbered List of Exemplary Method Embodiments

Method Embodiment 1. A method of operating a first user equipment (UE) (106), the method comprising: receiving (238 or 340), from a first base station (102) a request for information on neighboring base station time division duplexing (TDD) information; sending (254 or 356) from the first UE a first report including first neighbor cell identification information and first neighbor cell TDD configuration information corresponding to a first neighboring base station; and communicating (272 or 374) with the first base station in accordance with a TDD schedule generated by the first base station after receiving the first report including first neighbor cell identification information and first neighbor cell TDD configuration information.

Method Embodiment 1A. The method of Method Embodiment 1, wherein said TDD schedule is based on a TDD resource allocation (264 or 366) made by the first base station based on the received first neighbor cell TDD configuration information (e.g. schedule TDD so that downlink transmission coincide with that of one or more neighbor cells including the first neighboring cell and/or schedule uplink transmissions so that they occur when downlink transmissions of neighboring cell and/or flexible slots in neighboring cell occur—e.g., to avoid interference from other base station downlinks when UEs are trying to transmit uplink signals to the first base station).

Method Embodiment 2. The method of Method Embodiment 1, wherein said TDD schedule indicates a first set of frequency resources to be used for downlink communications when the neighboring base station is using frequency resources (e.g., frequency resources in the first set of frequency resources or frequency resources adjacent said first set of frequency resources) for downlink communication.

Method Embodiment 3. The method of Method Embodiment 1, wherein the first base station (102) and first neighboring base station (104) are part of the same network (e.g., as shown in the FIG. 2 example).

Method Embodiment 3A The method of Method Embodiment 1, wherein the first base station (102) and first neighboring base station (108) are part of different networks (e.g., as shown in the FIG. 3 example).

Method Embodiment 4. The method of Method Embodiment 2, further comprising, prior to receiving (238 or 340), from a first base station a request for information on neighboring base station time division duplexing (TDD) information, the steps of: receiving (206 or 310) an instruction from the first base station (102) to report at least some neighbor base station information; and sending (224 or 328), to the first base station (102), a report (226 or 330) including cell information corresponding to the first neighbor cell but not including cell timing division duplex (TDD) configuration information.

Method Embodiment 4A1. The method of Method Embodiment 4, wherein said report (226 or 330) including cell information corresponding to the first neighbor cell does not include a cell global identifier (NCGI or ECGI).

Method Embodiment 4A. The method of Method Embodiment 4, wherein receiving (206 or 310) an instruction to the first UE to report neighbor base station information includes receiving (206) an instruction (204) to perform measurements on signals received from neighbor cells and to report back measurement information; and wherein sending (224 or 328) a report (226 or 330) including cell information includes sending (224) a measurement report (226) including cell identification information (e.g., PCI) and corresponding signal strength information (e.g., measured strength of a signal from the first neighbor cell).

Method Embodiment 4B. The method of Method Embodiment 4, wherein receiving (206 or 310) an instruction to the first UE to report neighbor base station information includes receiving (310) a report neighbor request (308)

including information indicating a radio access technology (RAT) to be searched to discover neighbor base stations and one or more frequency bands to be search when searching for base stations corresponding to the indicated RAT; and wherein sending (224 or 328) a report (226 or 330) including cell information includes sending a report (330) in the form of a neighbor response measurement report including one or more PCIs of neighboring base stations detected as part of the requested search.

Method Embodiment 4C. The method of Method Embodiment 4B, wherein the RAT to be searched is New Radio (NR).

Method Embodiment 4C1. The method of Method Embodiment 4B, wherein the RAT to be searched is Long Term Evolution (LTE) (e.g., Evolved Universal Terrestrial (E-UTRAN)).

Method Embodiment 4D. The method of claim 4B, wherein a frequency band to be searched in a shared frequency band.

Method Embodiment 4E. The method of Method Embodiment 4B, wherein a frequency band to be searched is unlicensed spectrum.

Method Embodiment 5. The method of Method Embodiment 4, wherein said report (226 or 330), including cell information corresponding to the first neighbor cell but not including cell timing division duplex (TDD) configuration information, includes received signal power information for a signal (e.g., a broadcast signals conveying a Synchronization Signal Block (SSB)) received from said first neighboring base station; and wherein the request (236 or 338) for information on neighboring base station time division duplexing (TDD) information includes a base station identifier (e.g., a PCI) for the first neighboring base station.

Method Embodiment 5A. The method of Method Embodiment 5, wherein the request (236 or 338) for information on neighboring base station time division duplexing (TDD) information is part of a request for information on the neighboring base station which further requests a global cell identifier (New Radio Cell Global Identifier (NCGI) (in 5G NR) or EUTRA Cell Global Identifier (ECGI) (in 4G LTE)) for the first neighboring base station.

Method Embodiment 5B. The method of Method Embodiment 5A, wherein the request (236 or 338) for information on neighboring base station time division duplexing (TDD) information is part of a request for information on the neighboring base station which further requests one of more of: a Tracking Area Code (TAC), a Radio Access Network Notification Area Code (RANAC), a Public Land Mobile Network (PLMN) ID, or a frequency band for the first neighboring base station.

Method Embodiment 6. The method of Method Embodiment 4, further comprising: receiving (250 or 352) signals from the first neighbor base station during one or more idle periods implemented at the first base station to provide periods in which the first UE can perform neighbor base station measurements.

Method Embodiment 7. The method of Method Embodiment 4, further comprising: storing (251 or 353), in memory, TDD-UL-DL configuration information for the first neighbor base station in a neighbor cell list maintained by the first UE.

Second Numbered List of Exemplary Apparatus Embodiments

Apparatus Embodiment 1. A first user equipment (UE) (106 or 500) comprising: a wireless receiver (526); a wireless transmitter (528); memory (512); and a processor (502) configured to: operate the first UE to receive (238 or 340) (via wireless receiver 526), from a first base station (102) a request for information on neighboring base station time division duplexing (TDD) information; operate the first UE to send (254 or 356) (via wireless transmitter 528) from the first UE a first report including first neighbor cell identification information and first neighbor cell TDD configuration information corresponding to a first neighboring base station (104 or 108); and operate the first UE to communicate (272 or 374) (via wireless receiver 526 and/or wireless transmitter 528) with the first base station in accordance with a TDD schedule generated by the first base station after receiving the first report including first neighbor cell identification information and first neighbor cell TDD configuration information.

Apparatus Embodiment 1A. The first UE of Apparatus Embodiment 1, wherein said TDD schedule is based on a TDD resource allocation (264 or 366) made by the first base station based on the received first neighbor cell TDD configuration information (e.g. schedule TDD so that downlink transmission coincide with that of one or more neighbor cells including the first neighboring cell and/or schedule uplink transmissions so that they occur when downlink transmissions of neighboring cell and/or flexible slots in neighboring cell occur—e.g., to avoid interference from other base station downlinks when UEs are trying to transmit uplink signals to the first base station).

Apparatus Embodiment 2. The first UE of Apparatus Embodiment 1, wherein said TDD schedule indicates a first set of frequency resources to be used for downlink communications when the neighboring base station is using frequency resources (e.g., frequency resources in the first set of frequency resources or frequency resources adjacent said first set of frequency resources) for downlink communication.

Apparatus Embodiment 3. The first UE of Apparatus Embodiment 1, wherein the first base station (102) and first neighboring base station (104) are part of the same network (e.g., as shown in the FIG. 2 example).

Apparatus Embodiment 3A The first UE of Apparatus Embodiment 1, wherein the first base station (102) and first neighboring base station (108) are part of different networks (e.g., as shown in the FIG. 3 example).

Apparatus Embodiment 4. The first UE of Apparatus Embodiment 2, wherein said processor (502) is further configured to operate the UE to perform, prior to receiving (238 or 340), from a first base station a request for information on neighboring base station time division duplexing (TDD) information, the steps of: receiving (206 or 310) (via wireless receiver 526) an instruction from the first base station (102) to report at least some neighbor base station information; and sending (224 or 328) (via wireless transmitter 528), to the first base station (102), a report (226 or 330) including cell information corresponding to the first neighbor cell but not including cell timing division duplex (TDD) configuration information.

Apparatus Embodiment 4A1. The first UE of Apparatus Embodiment 4, wherein said report (226 or 330) including cell information corresponding to the first neighbor cell does not include a cell global identifier (NCGI or ECGI).

Apparatus Embodiment 4A. The first UE of Apparatus Embodiment 4, wherein said processor (502) is configured to: operate the first UE to receive (206) (via wireless receiver 526) an instruction (204) to perform measurements on signals received from neighbor cells and to report back measurement information, as part of being configured to operate the first UE to receive (206 or 310) an instruction to the first UE to report neighbor base station information includes; and operate the first UE to send (224) (e.g., via wireless transmitter 528) a measurement report (226) including cell identification information (e.g., PCI) and corresponding signal strength information (e.g., measured strength of a signal from the first neighbor cell), as part of being configured to operate the UE to send (224 or 328) a report (226 or 330) including cell information.

Apparatus Embodiment 4B. The first UE of Apparatus Embodiment 4, wherein said processor (502) is configured to operate the first UE to receive (310) (via wireless receiver 526) a report neighbor request (308) including information indicating a radio access technology (RAT) to be searched to discover neighbor base stations and one or more frequency bands to be search when searching for base stations corresponding to the indicated RAT, as part of being configured to operate the first UE to receive (206 or 310) an instruction to the first UE to report neighbor base station information includes; and wherein said processor (502) is configured to operate the first UE to send (via wireless transmitter 528) a report (330) in the form of a neighbor response measurement report including one or more PCIs of neighboring base stations detected as part of the requested search, as part of being configured to operate the UE to send (224 or 328) a report (226 or 330) including cell information.

Apparatus Embodiment 4C. The first UE of Apparatus Embodiment 4B, wherein the RAT to be searched is New Radio (NR).

Apparatus Embodiment 4C1. The first UE of Apparatus Embodiment 4B, wherein the RAT to be searched is Long Term Evolution (LTE) (e.g., Evolved Universal Terrestrial (E-UTRAN)).

Apparatus Embodiment 4D. The first UE of Apparatus Embodiment 4B, wherein a frequency band to be searched in a shared frequency band.

Apparatus Embodiment 4E. The first UE of Apparatus Embodiment 4B, wherein a frequency band to be searched is unlicensed spectrum.

Apparatus Embodiment 5. The first UE of Apparatus Embodiment 4, wherein said report (226 or 330), including cell information corresponding to the first neighbor cell but not including cell timing division duplex (TDD) configuration information, includes received signal power information for a signal (e.g., a broadcast signals conveying a Synchronization Signal Block (SSB)) received from said first neighboring base station; and wherein the request (236 or 338) for information on neighboring base station time division duplexing (TDD) information includes a base station identifier (e.g., a PCI) for the first neighboring base station.

Apparatus Embodiment 5A. The first UE of Apparatus Embodiment 5, wherein the request (236 or 338) for information on neighboring base station time division duplexing (TDD) information is part of a request for information on the neighboring base station which further requests a global cell identifier (New Radio Cell Global Identifier (NCGI) (in 5G NR) or EUTRA Cell Global Identifier (ECGI) (in 4G LTE) for the first neighboring base station.

Apparatus Embodiment 5B. The first UE of Apparatus Embodiment 5A, wherein the request (236 or 338) for information on neighboring base station time division duplexing (TDD) information is part of a request for information on the neighboring base station which further requests one of more of: a Tracking Area Code (TAC), a Radio Access Network Notification Area Code (RANAC), a Public Land Mobile Network (PLMN) ID, or a frequency band for the first neighboring base station.

Apparatus Embodiment 6. The first UE of Apparatus Embodiment 4, wherein said processor (502) is further configured to: operate the first UE to receive (250 or 352) (via wireless receiver 526) signals from the first neighbor base station during one or more idle periods implemented at the first base station to provide periods in which the first UE can perform neighbor base station measurements.

Apparatus Embodiment 7. The first UE of Apparatus Embodiment 4, wherein said processor (502) is further configured to: store (251 or 353), in memory (512), TDD-UL-DL configuration information for the first neighbor base station in a neighbor cell list maintained by the first UE.

Second Numbered List of Exemplary
Non-Transitory Computer Readable Medium
Embodiments Non-Transitory Computer Readable Medium Embodiment 1. A non-transitory computer readable medium (512) including machine executable instructions, which when executed by a processor (502) of a first user equipment (UE) (106 or 500) cause the UE (106 or 500) to perform the steps of: receiving (238 or 340), from a first base station (102), a request for information on neighboring base station time division duplexing (TDD) information; sending (254 or 356) from the first UE a first report including first neighbor cell identification information and first neighbor cell TDD configuration information corresponding to a first neighboring base station; and communicating (272 or 374) with the first base station in accordance with a TDD schedule generated by the first base station after receiving the first report including first neighbor cell identification information and first neighbor cell TDD configuration information.

Various embodiments are directed to apparatus, e.g., NG-RAN nodes such as gNB, ng-eNBs, etc., RAN nodes, e.g. eNBs, etc., UEs, base stations supporting massive MIMO such as CBSDs supporting massive MIMO, network management nodes, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), a Spectrum Access System (SAS), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating a NG-RAN nodes such as gNB, ng-eNBs, etc., RAN nodes, e.g. eNBs, etc., UEs, a base station supporting massive MIMO such as a CBSD supporting massive MIMO, a network management node, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, SAS, an AFC system, cable networks, cloud networks, nodes, servers, cloud service servers, customer premises equipment devices, controllers, network monitoring nodes and/or servers and/or cable or network equipment devices. Various embodiments are directed to communications networks which are partners, e.g., a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a NG-RAN nodes such as gNB, ng-eNBs, etc., RAN nodes, e.g. eNBs, etc., a UE, a base station supporting massive MIMO such as a CBSD supporting massive MIMO, a network management device, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, SAS, a AFC system, etc., said device including a processor configured to implement one, multiple or all of the steps of one or more methods of the invention.

In some embodiments, the processor or processors, e.g., CPUs, of one or more devices, e.g., a NG-RAN node such as gNB, ng-eNBs, etc., a RAN node, e.g. eNBs, etc., a UE, a base station supporting massive MIMO such as a CBSD supporting massive MIMO, a network management device, communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g. a MME, a SAS, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration.

Accordingly, some but not all embodiments are directed to a device, e.g., a NG-RAN node such as gNB, ng-eNBs, etc., a RAN node, e.g. eNB, etc., a UE, a base station supporting massive MIMO such as a CBSD supporting massive MIMO, a network management device, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a communications node such as e.g., a NG-RAN node such as gNB, ng-eNB, etc., a RAN node, e.g. eNB, etc., a UE, a base station supporting massive MIMO such as a CBSD supporting massive MIMO, a network management device, an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a NG-RAN nodes such as gNB, ng-eNB, etc., a RAN node, e.g. eNBs, etc., a UE, a base station supporting massive MIMO such as a CBSD supporting massive MIMO, a network management node or device, a communications device such as a communications nodes such as e.g., an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, MNVO base station, e.g., a CBSD, an MNO cellular base station, e.g., an eNB or a gNB, a UE device, a SAS or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a first base station, the method comprising:
    sending an instruction to a first user equipment (UE) to report at least some neighbor base station information, said step of sending the instruction to the first UE to report at least some neighbor base station information including sending a report neighbor request, said report neighbor request including information indicating a radio access technology (RAT) to be searched to discover neighbor base stations and one or more frequency bands to be searched when searching for base stations corresponding to the indicated RAT;
    receiving, from the first UE, a report including cell information corresponding to a first neighbor cell but not including cell time division duplex (TDD) configuration information, said received report including cell information corresponding to the first neighbor cell but not including cell TDD configuration information being a neighbor response measurement report including one or more PCIs of neighboring base stations detected as part of the requested search;
    sending to the first UE a request for information on neighboring base station TDD information; and
    receiving from the first UE a first report including first neighbor cell identification information and first neighbor cell TDD configuration information corresponding to the first neighboring base station.

2. The method of claim 1, further comprising:
    making a TDD resource allocation based on the received first neighbor cell TDD configuration information received from the first UE.

3. The method of claim 1, wherein the first base station and first neighboring base station are part of the same network.

4. The method of claim 1, wherein said received report, including cell information corresponding to the first neighbor cell but not including cell TDD configuration information, includes received signal power information for a signal received from said first neighboring base station; and
    wherein the request for information on neighboring base station TDD information includes a base station identifier for the first neighboring base station.

5. The method of claim 1, further comprising:
    updating a neighbor cell list in the first base station with TDD-UL-DL configuration information for the first neighbor base station with received TDD configuration information.

6. A method of operating a first base station, the method comprising:
    sending an instruction to a first user equipment (UE) to report at least some neighbor base station information;
    receiving, from the first UE, report including cell information corresponding to the first neighbor cell but not including cell time division duplex (TDD) configuration information;
    sending to the first UE a request for information on a first neighboring base station that requests neighboring base station TDD information relating to the first neighboring base station and which further requests a global cell identifier for the first neighboring base station; and
    receiving from the first UE a first report including first neighbor cell identification information and first neighbor cell TDD configuration information corresponding to the first neighboring base station.

7. A method of operating a first base station, the method comprising:
    sending an instruction to a first user equipment (UE) to report at least some neighbor base station information;
    receiving, from the first UE, a report including cell information corresponding to a first neighbor cell but not including cell time division duplex (TDD) configuration information;
    sending to the first UE a request for information on neighboring base station TDD information; and
    receiving from the first UE a first report including first neighbor cell identification information and first neighbor cell TDD configuration information corresponding to a first neighboring base station;
    scheduling one or more idle periods to provide periods in which the first UE can perform neighbor base station measurements; and
    implementing a transmission schedule including operating the first base station to refrain from transmission during the scheduled idle periods.

8. A first base station, comprising:
a wireless transmitter;
a wireless receiver; and
a processor configured to:
operate the first base station to send an instruction to a first user equipment (UE) to report at least some neighbor base station information said instruction being in the form of a report neighbor request including information indicating a radio access technology (RAT) to be searched to discover neighbor base stations and one or more frequency bands to be searched when searching for base stations corresponding to the indicated RAT;
operate the first base station to receive, from the first UE, a report including cell information corresponding to a first neighbor cell but not including cell time division duplex (TDD) configuration information, said received report including cell information corresponding to the first neighbor cell including one or more PCIs of neighboring base stations detected as part of the requested search;
operate the first base station to send to the first UE a request for information on neighboring base station TDD information; and
operate the first base station to receive from the first UE a first report including first neighbor cell identification information and first neighbor cell TDD configuration information corresponding to a first neighboring base station.

9. The first base station of claim 8, wherein said processor is further configured to:
make a TDD resource allocation based on the received first neighbor cell TDD configuration information received from the first UE.

10. The first base station of claim 8, wherein the first base station and first neighboring base station are part of the same network.

11. The first base station of claim 8, wherein said received report, including cell information corresponding to the first neighbor cell, includes received signal power information for a signal received from said first neighboring base station; and
wherein the request for information on neighboring base station TDD information includes a base station identifier for the first neighboring base station.

12. A method of operating a first user equipment (UE), the method comprising:
receiving, from a first base station, a request for information on neighboring base station time division duplex (TDD) information;
sending from the first UE a first report including first neighbor cell identification information and first neighbor cell TDD configuration information corresponding to a first neighboring base station; and
communicating with the first base station in accordance with a TDD schedule generated by the first base station after receiving the first report including first neighbor cell identification information and first neighbor cell TDD configuration information, said TDD schedule indicating a first set of frequency resources to be used for downlink communications when the first neighboring base station is using frequency resources for downlink communication.

13. The method of claim 12, wherein said TDD schedule is based on a TDD resource allocation made by the first base station based on the received first neighbor cell TDD configuration information.

14. The method of claim 12, wherein the first base station and first neighboring base station are part of the same network.

15. The method of claim 12, further comprising, prior to receiving, from the first base station, a request for information on neighboring base station time division duplex (TDD) information, the steps of:
receiving an instruction from the first base station to report at least some neighbor base station information; and
sending, to the first base station, a report including cell information corresponding to the first neighbor cell but not including cell TDD configuration information.

16. The method of claim 15, wherein said report, including cell information corresponding to the first neighbor cell but not including cell TDD configuration information, includes received signal power information for a signal received from said first neighboring base station; and
wherein the request for information on neighboring base station TDD information includes a base station identifier for the first neighboring base station.

17. The method of claim 15, further comprising:
receiving signals from the first neighbor base station during one or more idle periods implemented at the first base station to provide periods in which the first UE can perform neighbor base station measurements.

18. A first user equipment (UE) comprising:
a wireless receiver;
a wireless transmitter;
memory; and
a processor configured to:
operate the first UE to receive, from a first base station, a request for information on neighboring base station time division duplex (TDD) information;
operate the first UE to send from the first UE a first report including first neighbor cell identification information and first neighbor cell TDD configuration information corresponding to a first neighboring base station; and
operate the first UE to communicate with the first base station in accordance with a TDD schedule generated by the first base station after receiving the first report including first neighbor cell identification information and first neighbor cell TDD configuration information, said TDD schedule indicating a first set of frequency resources to be used for downlink communications when the neighboring base station is using frequency resources for downlink communication.

19. The first UE of claim 18, wherein said TDD schedule is based on a TDD resource allocation made by the first base station based on the received first neighbor cell TDD configuration information.

20. The first UE of claim 18, wherein the first base station and first neighboring base station are part of the same network.

21. The first UE of claim 18, wherein said processor is further configured to operate the first UE to perform, prior to receiving from the first base station a request for information on neighboring base station TDD information, the steps of:
receiving an instruction from the first base station to report at least some neighbor base station information; and
sending, to the first base station, a report including cell information corresponding to the first neighbor cell but not including cell TDD configuration information.

22. The first UE of claim 21, wherein said report, including cell information corresponding to the first neighbor cell but not including cell TDD configuration information, includes received signal power information for a signal received from said first neighboring base station; and wherein the request for information on neighboring base station TDD information includes a base station identifier for the first neighboring base station.

23. The first UE of claim 21, wherein said processor is further configured to:

operate the first UE to receive signals from the first neighboring base station during one or more idle periods implemented at the first base station to provide periods in which the first UE can perform neighbor base station measurements.

24. The first UE of claim 21, wherein said processor is further configured to:

store, in memory, TDD-UL-DL configuration information for the first neighboring base station in a neighbor cell list maintained by the first UE.

* * * * *